United States Patent [19]
Yamanaka et al.

[11] Patent Number: 5,892,845
[45] Date of Patent: *Apr. 6, 1999

[54] DATA COMMUNICATION AND PROCESSING SYSTEM IN WHICH CODE DATA GENERATED BY RECOGNITION OF IMAGE DATA IS TRANSMITTED

[75] Inventors: Kazunobu Yamanaka, Kawasaki; Mizuharu Maeda, Inagi; Yasutaka Gotoh, Tokyo, all of Japan

[73] Assignee: Ricoh Company, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 655,431

[22] Filed: May 30, 1996

[30] Foreign Application Priority Data

Jun. 2, 1995 [JP] Japan .................................. 7-137065
Oct. 11, 1995 [JP] Japan .................................. 7-263114

[51] Int. Cl.$^6$ ........................................................ H04N 1/32
[52] U.S. Cl. ............................. 382/187; 358/403; 358/407; 358/470
[58] Field of Search ..................................... 358/442, 468, 358/470, 434–436, 438–440, 402, 403, 407; 382/187, 189, 175; 395/200.1; H04N 1/32

[56] References Cited

U.S. PATENT DOCUMENTS

| | | | |
|---|---|---|---|
| 5,227,893 | 7/1993 | Ett .......................................... | 358/434 |
| 5,522,041 | 5/1996 | Murakami et al. . | |
| 5,552,901 | 9/1996 | Kikuchi et al. ........................... | 358/442 |
| 5,627,661 | 5/1997 | Negishi et al. .......................... | 358/403 |
| 5,671,067 | 9/1997 | Negishi et al. .......................... | 382/175 |

FOREIGN PATENT DOCUMENTS

| | | |
|---|---|---|
| 1-204560 | 8/1989 | Japan . |
| 1-236762 | 9/1989 | Japan . |
| 2-148280 | 6/1990 | Japan . |
| 5-250381 | 9/1993 | Japan . |

*Primary Examiner*—Kim Yen Vu
*Attorney, Agent, or Firm*—Oblon, Spivak, McClelland, Maier & Neustadt, P.C.

[57] ABSTRACT

A facsimile device is linked to an external station via a telephone line in a data communication and processing system, the external station being one of a host computer and a fax server. The facsimile device includes an input unit which inputs image data containing task processing data and a kind of task. A recognizing unit recognizes the task processing data and the kind of task from the image data from the input unit, and converts the task processing data and the kind of task into code data. A facsimile communication unit transmits the code data from the recognizing unit to the external station via the telephone line by using a facsimile communication function, the facsimile communication unit receiving code data from the external station via the telephone line by using the facsimile communication function.

29 Claims, 18 Drawing Sheets

FIG.5

OCR INPUT PATTERN SHEET (INSURANCE)

INQUIRY TASK　　　TASK NO. | 0 | 1 | — N

A
NAME OF CUSTOMER
| K | A | T | A | | K | A | N | A | | | | | |

DATE OF BIRTH　　　TYPE　　　CERTIFICATE NO.
| 1 | 9 | 6 | 5 | 0 | 8 | 2 | 2 |　　| 0 | 1 |

B
NAME OF CUSTOMER
(empty boxes)

DATE OF BIRTH　　　TYPE　　　CERTIFICATE NO.
　　　　　　　　　　　　　　　| 0 | 1 | 2 | 3 | 4 | 5 | 6 | 7 | 8 | 9 |

C
NAME OF CUSTOMER
(empty boxes)

DATE OF BIRTH　　　TYPE　　　CERTIFICATE NO.
(empty boxes)

RECIPIENT FAX NUMBER
(empty boxes)

TYPE (01:A, 02:B, 03:C, 04:D)

FIG.6

CUSTOMER INFORMATION

NAME OF CUSTOMER :
A A A A A

NAME IN KATAKANA :          BIRTH :                    SEX :
K K K K K                   1955/10/15                 M

ADDRESS 1 :
B B B B B B

ADDRESS 2 :

OFFICE TEL NO. :            HOME TEL NO. :
045-477-1514                045-3456-7890

SELECT                      QUIT

FIG.7

OCR INPUT PATTERN SHEET (INSURANCE)

ESTIMATION TASK

TASK NO.: | 0 | 2 |

01:

TYPE: | 0 | 1 |

DATE OF BIRTH: | 1 | 9 | 5 | 7 | 0 | 2 | 0 | 9 |   SEX: (M)  (F)

DATE AT START OF CONTRACT: | 1 | 9 | 9 | 5 | 0 | 3 | 0 | 1 |

YEAR AT END OF PAYMENT: | 5 | 0 |   DEFERRED PERIOD | 5 |   PERIOD OF INSURANCE | 1 | 0 |
5
10
15
20

PLAN 1
AMOUNT PAID: | 1 | 0 | 0 | 0 | 0 |

PLAN 2
| | | | | |

PLAN 3
| | | | | |

PAYMENT:

TYPE OF BASIC INSURANCE:

BASIC INSURANCE:

RECIPIENT FAX NO.:
| | | | | | | | | | |

FIG.8

ESTIMATION TASK

DATE OF BIRTH :　　SEX :
19570209　　　　　M　　F

DATE AT START　　YEAR AT END　　DEFERRED
OF CONTRACT :　　OF PAYMENT :　　PERIOD :
19950301　　　　　50　　　　　　　5

PERIOD OF
INSURANCE :
5　　10　　15　　20

AMOUNT
PAID :
10000
PLAN 1　　PLAN 2　　PLAN 3

RECIPIENT
FAX NO. :

START　　　　　CANCEL

| EXCLUSION COLOR SETTING PORTION | EXCLUSION COLOR BEING SET |
|---|---|
| ▨ ☐ ☐ | RED (R) |
| ☐ ▨ ☐ | GREEN (G) |
| ☐ ☐ ▨ | BLUE (B) |

DATA COMMUNICATION AND PROCESSING SYSTEM IN WHICH CODE DATA GENERATED BY RECOGNITION OF IMAGE DATA IS TRANSMITTED

BACKGROUND OF THE INVENTION

(1) Field of the Invention

The present invention relates to a data communication and processing system which provides a facsimile communication between a facsimile device and a host computer in order to transmit a kind of task and a processing data from the facsimile device to the host computer via a public telephone line and receive processed data on the facsimile device from the host computer via the telephone line.

(2) Discussion of the Background

In a conventional system wherein a personal computer and a host computer are linked, a telephone line is used to allow data communication between the personal computer and the host computer. Usually, the conventional system utilizes a network control unit (NCU) and a modulation/demodulation unit (MODEM) to carry out the data communication. There is a case in which a simplified system utilizing an acoustic coupler attached to a telephone handset is used.

It is necessary that the personal computer of the above-mentioned system inputs code data by using a keyboard of the personal computer and transmits the code data to the host computer via the telephone line. It is necessary that the personal computer of the above-mentioned system inputs code data, stored in a floppy disk or hard disk, by using a floppy disk drive or hard disk drive of the personal computer, and transmits the code data to the host computer via the telephone line.

However, it is problematic that the above-mentioned system recognizes image data, read from an input pattern sheet on which characters or lines are hand-written, and inputs code data as a result of the recognition to the personal computer. Also, it is problematic that the above-mentioned system transmits the recognized code data to the host computer via the telephone line.

Further, a conventional system wherein a facsimile device at a user location and a host computer at a data processing center are linked via a telephone line is used to provide a data communication between the facsimile device and the host computer. The conventional system may include a fax server at an intermediate location, the fax server and the host computer being linked via a local area network.

In the case of the above-mentioned system, image data, read from an original image, is transmitted from the facsimile device to the host computer via the telephone line by using a facsimile communication function. The image data (or facsimile data) from the facsimile device is received on the host computer, and recognized as code data that requests the host computer to perform a task processing. On the host computer, the task processing for the recognized code data is performed to produce processed data. The processed data is again converted into image data on the host computer, and the image data for the processed data is transmitted from the host computer to the facsimile device via the telephone line by using a facsimile communication function.

However, when the above-mentioned system is used, the image data (or facsimile data) must be transmitted and received on the telephone line between the facsimile device and the host computer. There is a problem in that when it is needed to send massive data, a processing time for the facsimile communication becomes very long. In addition, there is a problem in that when a facsimile communication over a long distance is needed, the cost of the facsimile communication becomes very high.

Further, when the above-mentioned system is used, image data (or facsimile data) from the facsimile device is received on the host computer, and recognized as code data that requests the host computer to perform a task processing. It is impossible that an operator on the facsimile device obtains a notification as to whether the image data received on the host computer is correctly recognized or whether the recognized code data has an error. In order to obtain the above notification, it is necessary for the operator on the facsimile device to directly inquire an operator on the host computer of the recognition of the image data transmitted thereto.

Therefore, when the above-mentioned system is used, it is necessary that a full-time operator is always allocated to the host computer or the fax server. Practically, it is difficult to always keep the host computer or the fax server of the above-mentioned system in a ready condition with a full-time operator being allocated thereto for 24 hours. The cost for the maintenance of the system in such a case would become very high.

SUMMARY OF THE INVENTION

An object of the present invention is to provide an improved data communication and processing system in which the above-described problems are eliminated.

Another object of the present invention is to provide an improved data communication and processing method and apparatus in which code data generated by a facsimile device by using an optical character recognition of image data including task processing data and a type of task is transmitted to a host computer via a telephone line.

Still another object of the present invention is to provide an improved facsimile device for a data communication and processing system in which code data is generated by using an optical character recognition of image data including task processing data and a kind of task and the code data is transmitted to a host computer via a telephone line.

A further object of the present invention is to provide an improved facsimile device for a data communication and processing system in which the optical character recognition of task processing data and a kind of task from image data on an input pattern sheet is efficiently performed by using an exclusion color setting function.

The above-mentioned objects of the present invention are achieved by a data communication and processing method for a system wherein a host computer and a facsimile device are linked via a telephone line, the method comprising the steps of: inputting image data containing task processing data and a kind of task to the facsimile device; recognizing the task processing data and the kind of task from the image data; converting the task processing data and the kind of task into code data; transmitting the code data from the facsimile device to the host computer via the telephone line by using a facsimile communication function; receiving the code data on the host computer from the facsimile device; converting the code data into the task processing data and the kind of task; performing a task processing procedure to produce processed data for the task processing data, the task processing procedure identified by the kind of task; transmitting code data of the processed data from the host computer to the facsimile device via the telephone line by using the facsimile communication function; and receiving the code data of the processed data on the facsimile device from the host computer via the telephone line.

The above-mentioned objects of the present invention are achieved by a data communication and processing system wherein a host computer and at least one facsimile device are linked via a telephone line, the facsimile device comprising: an input unit inputting image data containing task processing data and a kind of task; a recognizing unit recognizing the task processing data and the kind of task from the image data from the input unit, and converting the task processing data and the kind of task into code data; and a facsimile communication unit transmitting the code data from the recognizing unit to the host computer via the telephone line by using a facsimile communication function, the facsimile communication unit receiving code data from the host computer via the telephone line by using the facsimile communication function, and the host computer comprising: a facsimile communication unit receiving the code data from the facsimile device via the telephone line, and converting the code data into the task processing data and the kind of task; and a data processing unit performing a task processing procedure to produce processed data for the task processing data, the task processing procedure identified by the kind of task, the facsimile communication unit transmitting code data of the processed data from the data processing unit to the facsimile device via the telephone line by using a facsimile communication function.

The above-mentioned objects of the present invention are achieved by a facsimile device for a data communication and processing system, the facsimile device being linked to an external station via a telephone line, and the external station being one of a host computer and a fax server, the facsimile device comprising: an input unit inputting image data containing task processing data and a kind of task; a recognizing unit recognizing the task processing data and the kind of task from the image data from the input unit, and converting the task processing data and the kind of task into code data; and a facsimile communication unit transmitting the code data from the recognizing unit to the external station via the telephone line by using a facsimile communication function, the facsimile communication unit receiving code data from the external station via the telephone line by using the facsimile communication function.

Since code data is generated by the facsimile device by using the optical character recognition of image data containing task processing data and a kind of task and the code data is transmitted to the host computer via the telephone line, it is possible that the data communication and processing method and apparatus of the present invention remarkably reduce the processing time for the facsimile communication even if it is needed to transmit massive data. In addition, it is possible that the data communication and processing method and apparatus of the present invention remarkably reduce the cost of the facsimile communication.

When the data communication and processing system of the present invention is used, it is no longer necessary to allocate a full-time operator to the fax server or the host computer. This makes it possible to automatically operate the data communication and processing system including the facsimile device, the fax server and/or the host computer for 24 hours. Thus, the cost for the maintenance of the system can be reduced.

BRIEF DESCRIPTION OF THE DRAWINGS

The above and other objects, features and advantages of the present invention will be more apparent from the following detailed description when read in conjunction with the accompanying drawings in which:

FIG. 5 is a diagram of an example of an input pattern sheet read by the facsimile device for requesting a host computer to perform a task processing;

FIG. 6 is a diagram of an example of detailed information displayed in response to the input pattern sheet in FIG. 5;

FIG. 7 is a diagram of another example of an input pattern sheet read by the facsimile device for requesting the host computer to perform another task processing;

FIG. 8 is a diagram of an example of detailed information displayed in response to the input pattern sheet in FIG. 7;

DETAILED DESCRIPTION OF THE PREFERRED EMBODIMENTS

A description will now be given of the preferred embodiments of the present invention with reference to the accompanying drawings.

Figure 1:
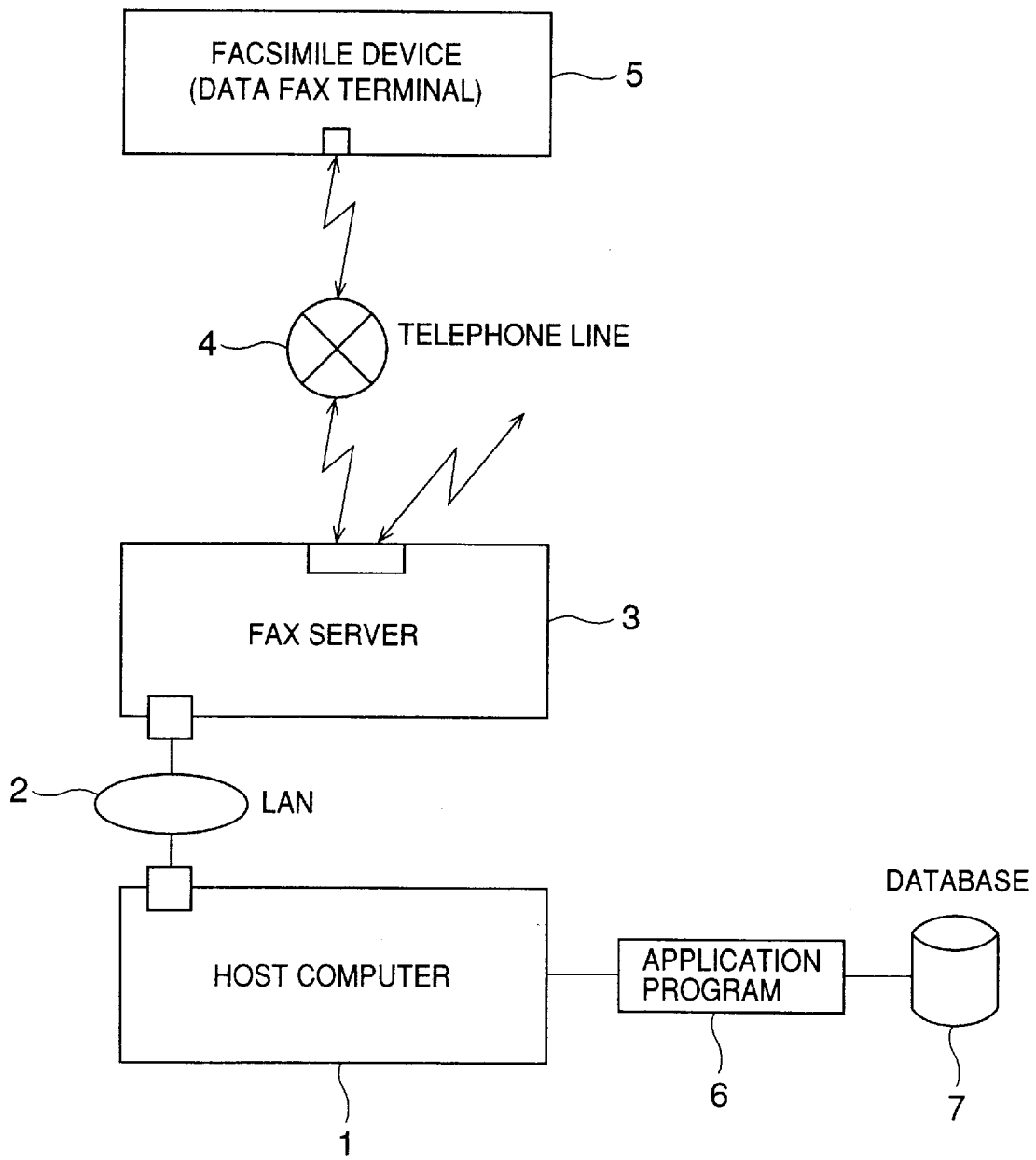
FIG. 1 is a block diagram of a data communication and processing system in one embodiment of the present invention.

FIG. 1 shows a basic structure of a data communication and processing system in one embodiment of the present invention.

As shown in FIG. 1, the data communication and processing system generally has a host computer 1, a fax server 3 linked to the host computer 1 via a local area network (LAN) 2, a telephone line 4 (or a public telephone line), and at least one facsimile device 5 linked to the fax server 3 via the telephone line 4. For the sake of convenience, a single facsimile device 5 linked to the fax server is shown in FIG.

1. Generally, the data communication and processing system includes a number of facsimile devices 5 linked to the fax server 3 via the telephone line 4.

The facsimile device 5 is called a data fax terminal. Generally, the data fax terminal has a G3 facsimile communication function, a facsimile data transfer function and an optical character recognition (OCR) function. The OCR function is to read out hand-written characters and lines from image data of an input pattern sheet and translate the images into a form that the computer can manipulate. The data fax terminal is capable of installing an application program which provides the above-mentioned functions.

The facsimile device 5 includes a scanner unit which is an image data inputting unit for inputting image data read from an original image. The facsimile device 5 uses the OCR function to recognize task processing data and a kind of task, included in the image data, and to convert the task processing data and the kind of task into code data. The facsimile device 5 uses the G3 facsimile communication function to transmit the code data to the fax server 3 via the telephone line 4, and to receive code data, derived from processed data produced by the host computer 1, from the fax server 3 via the telephone line 4.

The fax server 3 has a G3 facsimile communication function to transmit and receive code data between the fax server 3 and the facsimile device 5 over the telephone line 4. The fax server 3 has a LAN communication function to transmit and receive LAN code data between the fax server 3 and the host computer 1 over the LAN 2. By using the above communication functions, the fax server 3 converts the code data into the LAN code data for the transmission, and converts the LAN code data into the code data for the transmission.

The host computer 1 is, for example, a multi-purpose office computer or a mainframe computer. The host computer 1 has a LAN communication function to transmit and receive LAN code data between the host computer 1 and the fax server 3 over the LAN 2. The host computer 1 has an OCR function to recognize the code data received from the fax server 3 and to convert the code data into the task processing data and the kind of task.

The host computer 1 has a data processing function to perform a task processing procedure to produce processed data for the task processing data produced by the OCR function. The task processing procedure to be performed is identified by the kind of task recognized by using the OCR function. The host computer 1 uses the LAN communication function to transmit the processed data produced by the data processing function to the fax server 3 via the LAN 2.

An application program 6 which is used to carry out the above-mentioned functions of the host computer 1 is installed in the host computer 1. A database 7 stores data needed to execute the application program 6, and the database 7 is formed by an internal or external storage device of the host computer 1.

When the hardware and software for providing the above functions (e.g., the G3 facsimile communication function) of the facsimile server 3 are installed within the host computer 1, it is possible to omit the facsimile server 3 from the data communication and processing system in FIG. 1. In such a case, the data communication and processing system does not use the LAN 2 to provide the facsimile communications between the facsimile device 5 and the host computer 1 over the telephone line 4.

Figure 2:
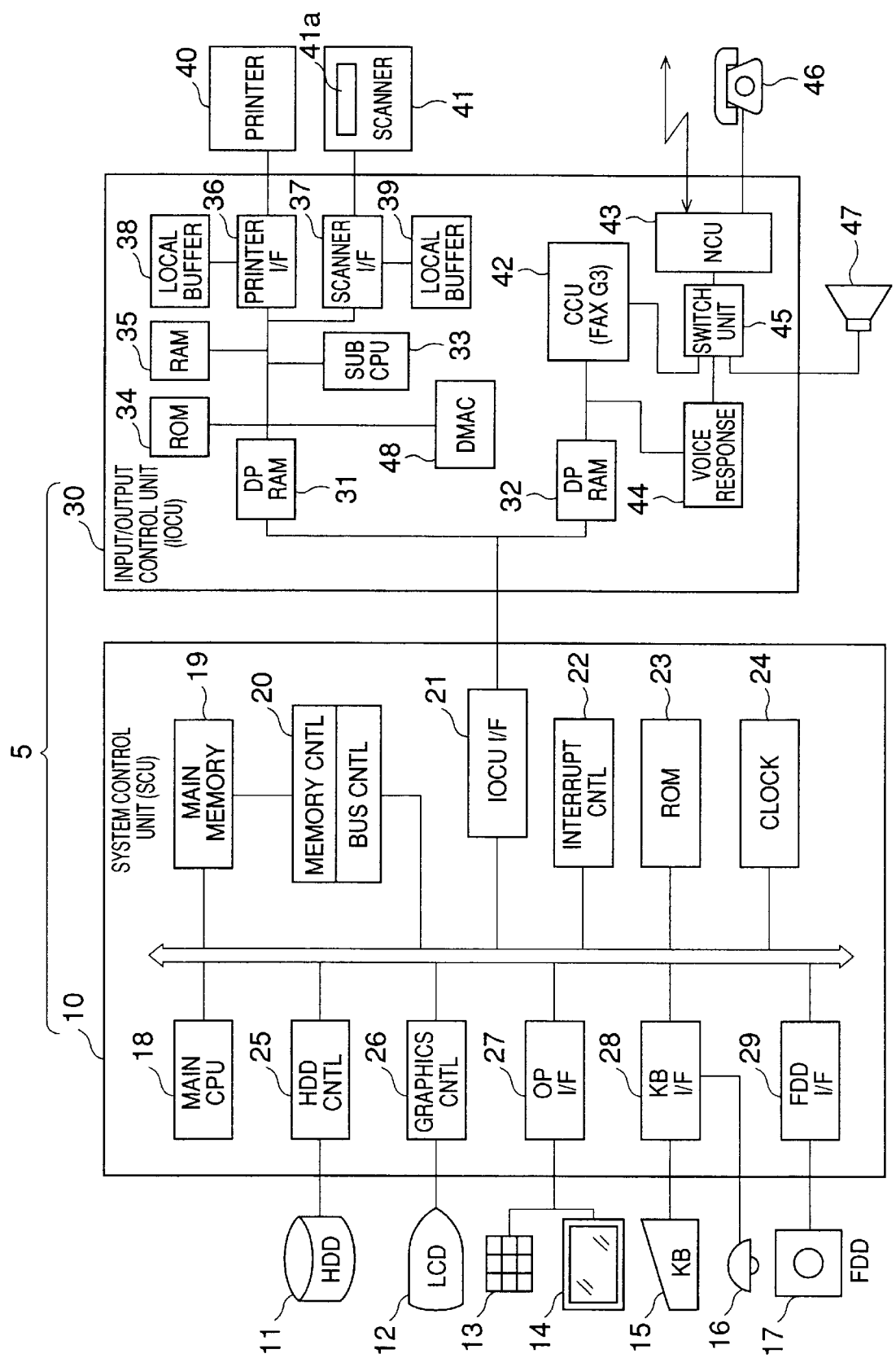
FIG. 2 is a block diagram of the hardware of a facsimile device of the data communication and processing system in FIG. 1.

FIG. 2 shows a construction of the hardware of the facsimile device 5 in FIG. 1. Referring to FIG. 2, the facsimile device 5 is divided into a system control unit (SCU) 10 and an input/output control unit (IOCU) 30.

In the facsimile device 5 of the present embodiment, an operation board including a ten-key 13 and a touch panel 14 is externally attached to an input port of the SCU 10. In addition, a hard disk drive (HDD) 11, a liquid crystal display unit (LCD) 12, a keyboard (KB) 15, a mouse 16, and a floppy disk drive (FDD) 17 are externally attached to other input ports of the SCU 10.

The above-mentioned SCU 10 contains a main central processing unit (main CPU) 18, a main memory 19, a memory/bus controller 20, an input/output-control-unit interface unit (IOCU I/F) 21, an interrupt controller 22, a read-only memory (ROM) 23, and a clock unit 24.

The SCU 10 further contains a HDD controller 25 connected to the HDD 11, a graphics controller 26 connected to the LCD 12, an operation board interface unit 27 connected to the ten-key 13 and the touch panel 14 of the operation board, a keyboard interface unit (KB I/F) 28 connected to the KB 15, and a FDD interface unit (FDD I/F) 29 connected to the FDD 17. As shown in FIG. 2, the above-mentioned elements of the SCU 10 are interconnected by a bus.

The IOCU 30 has two dual-port random access memories (DPRAMs) 31 and 32. The output of the IOCU I/F 21 of the SCU 21 is externally connected to each of the DPRAMs 31 and 32.

The output of the DPRAM 31 is connected to a sub-CPU 33 (which is a microcomputer), a ROM 34, a RAM 35, a direct memory access controller (DMAC) 38, a printer I/F 36, and a scanner I/F 37. A local buffer 38 is connected to the printer I/F 36. A local buffer 39 is connected to the scanner I/F 37. The printer I/F 36 of the IOCU 30 is connected to a printer unit 40 provided outside the IOCU 30. The scanner I/F 37 is connected to a scanner unit 41 provided outside the IOCU 30.

The printer unit 40 is, for example, an ink-jet type printer, and provides an image data output function. The scanner unit 41 includes a contact-type line sensor 41a. The scanner unit 41 provides an image data input function which reads out image data from an original image and inputs the image data to the terminal device 5 by using the line sensor 41a.

Further, the output of the DPRAM 32 of the IOCU 30 is connected to a communication control unit (CCU) 42. The CCU 42 includes a FAX G3 modem. A network control unit (NCU) 43 is connected to the CCU 42 via a switch unit 45. The telephone line 4 is connected to the NCU 43. In addition, a telephone set 46 provided outside the facsimile device 5 is connected to the NCU 43. The CCU 42 and the NCU 43 provides a facsimile communication function of the facsimile device 5.

In addition, the output of the DPRAM 32 is connected to a voice response circuit 44. The voice response circuit 44 provides an auxiliary function of the facsimile device 5. A speaker 47 is connected to the voice response circuit 44 via the switch unit 45. In addition, the NCU 43 is connected to the voice response circuit 44 via the switch unit 45.

The main CPU 18 of the SCU 10 controls the operation of the entire facsimile device 5. The HDD 11 stores a number of programs and a number of application programs which are used by the SCU 10. When a power switch of the facsimile device 5 is turned ON and an initial routine is executed by the main CPU 18, the required programs are read out from the HDD 11 via the HDD controller 35 so that the read programs are loaded to the main memory 19. A program required to execute the initial routine is stored in the ROM 23.

In order to transmit facsimile data from the facsimile device 5 to a destination facsimile device via the telephone line 4, an original document is set on the scanner unit 41 and a fax number of the destination facsimile device is input by using the ten-key 13 of the operation board. The destination facsimile device is a facsimile device having functions equivalent to those of the facsimile device 5, or the like. When a start key (not shown) of the facsimile device 5 is depressed, a data transmission procedure is started by the sub-CPU 33 in accordance with an instruction from the main CPU 18, and the respective elements of the IOCU 30 are controlled by the sub-CPU 33.

The scanner unit 41 is controlled to read out image data from the original document and input the image data to the facsimile device 5. The image data from the scanner unit 41 is temporarily stored in the local buffer 39 and the image data from the local buffer 39 is transferred to the DPRAM 31 by controlling the DMAC 48.

In addition, the current date/time data from the clock unit 24 is added to the image data in the DPRAM 31 via the IOCU I/F 21 in accordance with an instruction from the main CPU 18. The image data containing the date/time data is transferred from the DPRAM 31 to the DPRAM 32 in accordance with an instruction from the main CPU 18. The image data in the DPRAM 32 is read out and encoded into facsimile data by the CCU 42 in a sequential manner. The facsimile data from the CCU 42 is in conformity with the G3 standards. The facsimile data from the CCU 42 is transferred to the NCU 43 via the switch unit 45.

The NCU 43 performs a dialing of the facsimile number of the destination facsimile device. After a communication path between the facsimile device 5 and the destination facsimile device is established, the facsimile data from the NCU 43 is transmitted to the destination facsimile device via the telephone line 4.

When receiving facsimile data from a transmitting facsimile device on the facsimile device 5 via the telephone line 4, the facsimile device 5 is called by the transmitting facsimile device via the telephone line 4. The transmitting facsimile device is a facsimile device having functions equivalent to those of the facsimile device 5. The NCU 43 is set at a receiving state in response to the call from the transmitting facsimile device. The NCU 43 receives the facsimile data transmitted by the transmitting facsimile device via the telephone line 4, and transfers the received facsimile data to the CCU 42 via the switch unit 45.

The CCU 42 demodulates the facsimile data from the NCU 43 and decodes the facsimile data into image data. The image data from the CCU 42 is stored in the DPRAM 32 in a sequential manner.

The image data in the DPRAM 32 is transferred to the DPRAM 31 in accordance with an instruction from the main CPU 18. The image data in the DPRAM 31 is converted into print data at the printer I/F 36, and the print data from the printer I/F 36 is transferred to the printer unit 40. Accordingly, the image data received from the transmitting facsimile device is printed on a sheet of paper by the printer unit 40. When the rate of generating the print data on the printer I/F 36 is greater than the rate of printing the print data on the printer unit 40, the print data from the printer I/F 36 may be temporarily stored in the local buffer 38.

In addition, it is possible that the SCU 10 of the facsimile device 5 store the received image data in the main memory 19 without printing the same on the printer unit 40. The image data stored in the main memory 19 is converted into visual data by the graphics controller 26 so that the received image data is displayed on the LCD 12. The image data displayed on the LCD 12 is checked by an operator on the facsimile device 5. It is possible that only a selected piece of the image data be printed on the printer unit 40 in accordance with a print instruction input by using the touch panel 14 of the operation board or the keyboard 15.

In the case of the data communication and processing system of the above embodiment, in order to transmit code data containing task processing data and a kind of task, from the facsimile device 5 to the host computer 1, a data transmission option among a plurality of options of an operation menu on the touch panel 14 of the operation board is selected by the operator by using the touch panel 14. An input pattern sheet on which the task processing data and the kind of task are hand-written is set on the scanner unit 41, and the start key of the facsimile device 5 is depressed.

When the start key is depressed, a data transmission procedure is started by the sub-CPU 33 in accordance with an instruction from the main CPU 18, and the respective elements of the IOCU 30 are controlled by the sub-CPU 33.

The scanner unit 41 is controlled to read out image data from the input pattern sheet and input the image data to the IOCU 30 of the facsimile device 5. The image data from the scanner unit 41 is temporarily stored in the local buffer 39 and the image data is transferred to the DPRAM 31 by controlling the DMAC 48. Thus, the image data of the input pattern sheet is stored in the DPRAM 31.

The image data containing the task processing data and the kind of task is transferred from the DPRAM 31 to the main memory 19 via the IOCU I/F 21 in accordance with an instruction from the main CPU 18 of the SCU 10. By using the OCR function of the software loaded to the main memory 19, the main CPU 18 recognizes the task processing data and the kind of task in the image data by reading out characters and lines from the image data, and converts the task processing data and the kind of task into code data. The code data produced by using the OCR function is stored in the main memory 19.

The code data in the main memory 19 is converted by the graphics controller 26 into visual data, and the visual data is displayed on the LCD 12.

By viewing the visual data on the LCD 12, the operator can check that the task processing data and the kind of task of the input pattern sheet are correctly recognized. If the result of the recognition is found as being an error, or if inserting any additional data to the image data of the input pattern sheet is desired, an image data modification option among the options of the operation menu on the touch panel 14 can be selected by using the touch panel 14 and the ten-key 13. When the image data modification option is selected, a corresponding procedure for modifying the image data of the input pattern sheet or for adding any additional data to the same is carried out.

When a data transmission option of the operation menu on the touch panel 14 is selected after the above checking is completed, the main CPU 18 transfers the code data from the main memory 19 to the DPRAM 32 of the IOCU 30 via the IOCU I/F 21.

The NCU 43 performs a dialing of a preset facsimile number of the fax server 3. The fax server 3 is called by the facsimile device 5. After a communication path between the facsimile device 5 and the fax server 3 is established, the code data in the DPRAM 32 is read out and encoded into facsimile data by the CCU 42 in a sequential manner. The facsimile data is in conformity with the G3 standards and indicates the above code data containing the task processing data and the kind of task. The code data from the CCU 42 is transferred to the NCU 43 via the switch unit 45. The code data from the NCU 43 is transmitted to the fax server 3 via the telephone line 4.

Since the data being transmitted at this time is not the image data but the code data, the time for the data transmission can be reduced, and the cost of the transmission becomes low.

When the code data from the facsimile device 5 is received on the fax server 3, the fax server 3 converts the received code data into LAN code data. By using the LAN communication function, the fax server 3 transmits the LAN code data to the host computer 1 via the LAN 2.

When the code data from the fax server 3 is received on the host computer 1, the host computer 1 recognizes the received code data and converts the received code data into the task processing data and the kind of task by using the OCR function.

By using the data processing function, the host computer 1 performs a task processing procedure to produce processed data for the task processing data, the task processing data being recognized by the OCR function. The task processing procedure to be performed is identified by the kind of task recognized by the OCR function.

After the task processing procedure is performed, the host computer 1 transmits code data (derived from the processed data) to the fax server 3 via the LAN 2, by using the LAN communication function.

When the code data of the processed data from the host computer 1 is received on the fax server 3, the fax server 3 converts the received code data into facsimile data by using the facsimile communication function. The fax server 3 transmits the code data to the facsimile device 4 via the telephone line 4.

In the case of the data communication and processing system of the above-described embodiment, when receiving the code data (derived from the processed data) from the fax server 3 on the facsimile device 5, the facsimile device 5 is called by the fax server 3 via the telephone line 4. The NCU 43 of the IOCU 30 is set at the receiving state in response to the call from the fax server 3. The NCU 43 receives the code data transmitted by the fax server 3 via the telephone line 4, and transfers the received code data to the CCU 42 via the switch unit 45.

The CCU 42 demodulates the code data from the NCU 43 and decodes the code data into the original processed data. The processed data from the CCU 42 is stored in the DPRAM 32 in a sequential manner.

The processed data in the DPRAM 32 is transferred to the main memory 19 via the IOCU I/F 21 in accordance with an instruction from the main CPU 18 of the SCU 10. The code data (derived from the processed data) in the main memory 19 is converted by the graphics controller 26 into visual data, and the visual data is displayed on the LCD 12.

The operator can view the visual data (or the processed data) on the LCD 12. If a command for storing a selected piece of the processed data in a recording medium of the HDD 11 or the FDD 17 is input by the operator, the storing of the selected data piece in the recording medium (a hard disk or a floppy disk) provided within the facsimile device 5 is carried out.

In addition, if a command for printing the code data (or the processed data), stored in the main memory 19, on a sheet of paper is input by the operator, the code data in the main memory 19 is transferred to the DPRAM 31 via the IOCU I/F 21 in accordance with an instruction from the main CPU 18. The code data in the DPRAM 31 is converted into print data by the printer I/F 36, and the print data from the printer I/F 36 is transferred to the printer unit 40. Accordingly, the processed data from the host computer 1 is printed on the sheet of paper by the printer unit 40.

When the printer unit 40 has a data overlay function, it is possible to produce a printed output pattern sheet on which the processed data is printed in an overlaying manner in accordance with a predetermined format of the output pattern sheet.

In the case of the data communication and processing system of the above-described embodiment, it is possible to input image data, stored in a floppy disk, to the facsimile device 5 by using the FDD 17, instead of using the scanner unit 40. In addition, when an optical disk drive (not shown) is connected to the facsimile device 5, it is possible for the data communication and processing system of the above embodiment to input image data, stored in an optical disk, to the facsimile device 5 by using the optical disk drive.

Further, in the case of the data communication and processing system of the above embodiment, it is possible to transmit code data of identification data, in addition to the code data of the task processing data and the kind of task, to the host computer 1. When the processed data for the task processing data is produced on the host computer 1, the host computer 1 transmits the code data of the processed data with the identification data to the facsimile device 5. When the code data from the host computer 1 is received on the facsimile device 5, a message for the identification data is produced. The processed data received from the host computer 1 and the message produced by the facsimile device 5 can be displayed on the LCD 12 and can be printed on a sheet of paper by the printer unit 40.

Figure 3:
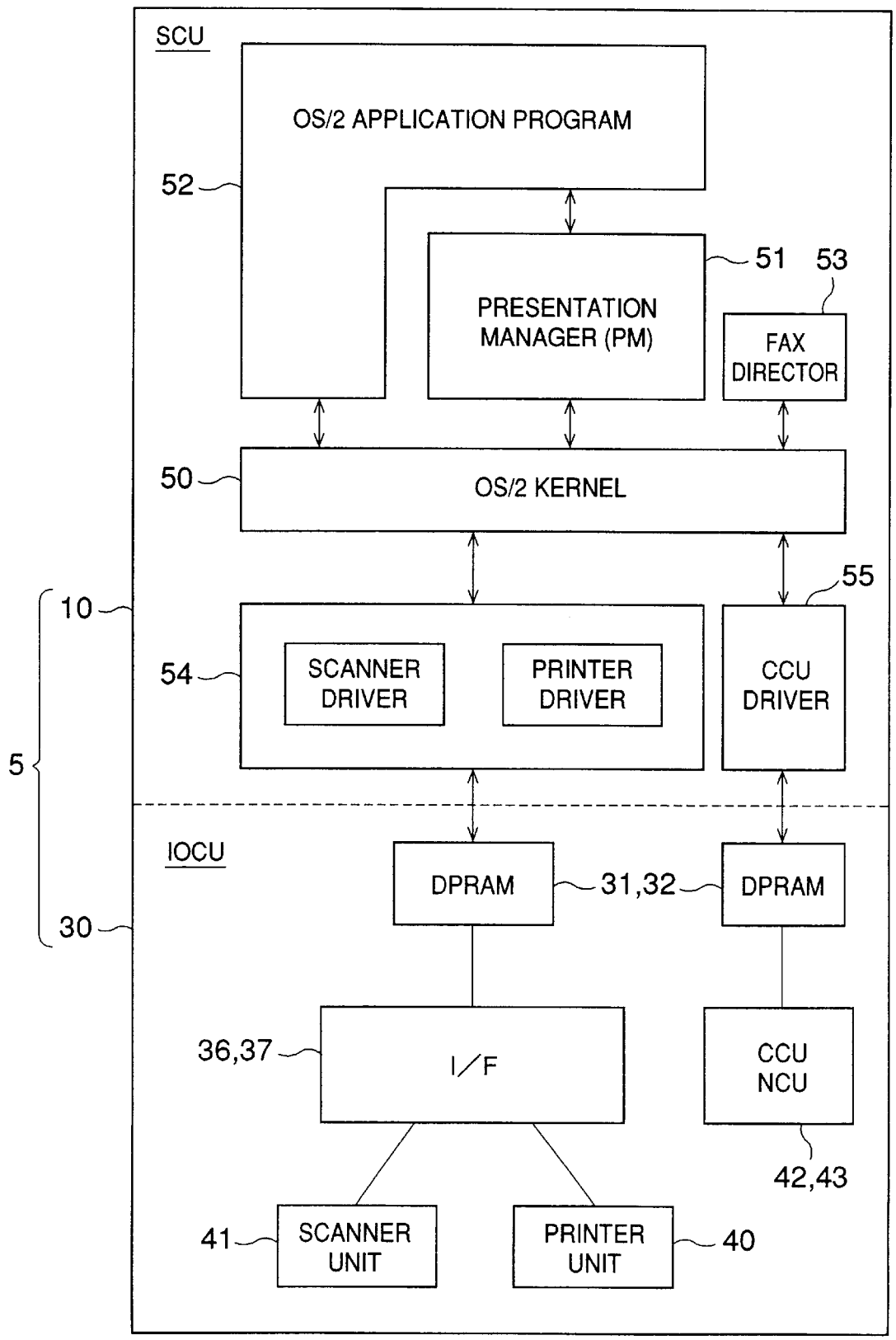
FIG. 3 is a block diagram of the software of the facsimile device in FIG. 2.

FIG. 3 shows a construction of the software of the facsimile device 5 in FIG. 1. In FIG. 3, the elements of the IOCU 30 which are the same as corresponding elements of the hardware of the IOCU 30 in FIG. 2 are designated by the same reference numerals.

Referring to FIG. 3, the IOCU 30 contains various programs which are executed by the main CPU 18. An operating system 50 which is called the OS/2 Kernel is included in the IOCU 30. Presentation Manager (PM) 51, an OS/2 application program 52 and a FAX director 53 which are also included in the IOCU 30 are executed on the operating system 50. The PM 51 provides a graphical user interface. The OS/2 application program 52 provides the OCR function, the facsimile communication function, and the task processing function. The FAX director 53 is used to control the data transmission and receiving of the facsimile device 5. Further, in order to control the elements of the IOCU 30 in accordance with the processing of the operating system 50, a set of drivers 54 including a scanner driver for the scanner unit 41 and a printer driver for the printer unit 40, and a CCU driver 55 for the CCU 41 and the NCU 43 are included in the IOCU 30.

Figure 4:
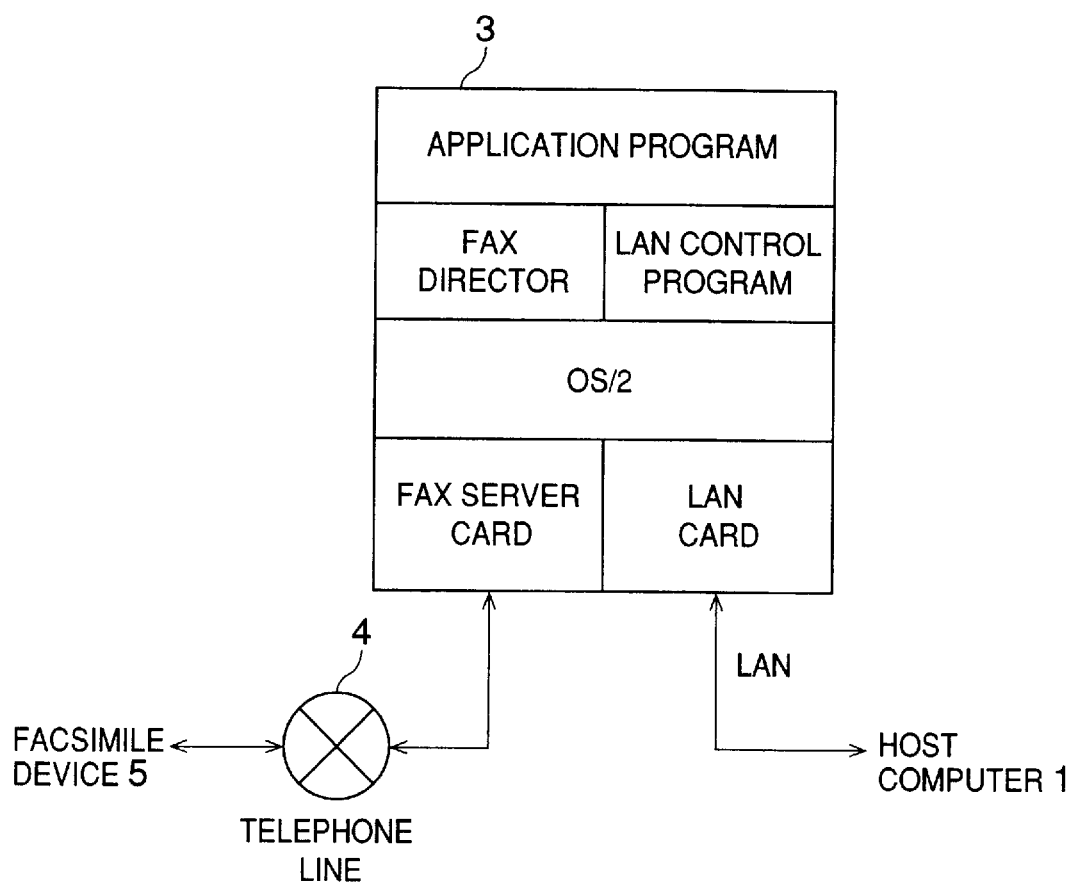
FIG. 4 is a block diagram of the software of a facsimile server of the data communication and processing system in FIG. 1.

FIG. 4 shows a construction of the software of the facsimile server 3 in FIG. 1.

Referring to FIG. 4, the facsimile server 3 contains various programs which are executed by a microcomputer of the facsimile server 3. Similarly to the software of the facsimile device 5, the facsimile server 3 includes an operating system OS/2, an application program, a LAN control program, and a FAX director. The application program, the LAN control program and the FAX director are executed on the operating system OS/2. Further, the facsimile server 3 includes a facsimile server card and a LAN card. The facsimile server card provides a facsimile communication function to communicate with the facsimile device 5 via the telephone line 4. The LAN card provides a LAN communication function to communicate with the host computer 1 via the local area network LAN.

When the hardware and software for providing the above functions of the facsimile server 3 are installed within the host computer 1, it is possible to omit the facsimile server 3 from the data communication and processing system of the present invention in FIG. 1. In such a case, the data communication and processing system does not use the LAN to provide the facsimile communications between the facsimile device 5 and the host computer 1.

It is possible to apply the data communication and processing system of the above embodiment to various kinds of task processings by changing the application program 6, the database 7, and the application program of the facsimile device 5.

For example, the data communication and processing system of the above embodiment can be applied to insurance task processings including an inquiry task processing of automotive insurance and an estimation task processing of accident insurance.

Next, a description will be given of a case in which the data communication and processing system of the above embodiment is applied to the inquiry task processing with reference to FIGS. 5 and 6.

FIG. 5 shows an example of an OCR input pattern sheet read by the facsimile device 5 to request the host computer 1 to perform the inquiry task processing. In FIG. 5, the input pattern sheet is prepared in a predetermined form printed with drop-out color.

On the input pattern sheet in FIG. 5, a section "N" indicates a task number which defines the kind of task, and each of a number of sections "A", "B" and "C" indicates customer data which defines the task processing data. The task number "01" which is assigned to the inquiry task is hand-written at the section "N". A name of the customer in Katakana in Japanese, a date of the birth, a type of the insurance, and a certificate number are hand-written at any appropriate one of the columns "A", "B" and "C".

The above input pattern sheet, shown in FIG. 5, is set on the scanner unit 41 of the facsimile device 5.

When the start key of the facsimile device 5 is depressed, the scanner unit 41 is controlled to read out image data from the input pattern sheet and input the image data to the IOCU 30 of the facsimile device 5. The image data of the input pattern sheet is stored in the DPRAM 31.

The main CPU 18 uses the OCR function to recognizes the task processing data (the name of the customer, the date of the birth and/or the certificate number) and the kind of task (the task number) from the image data, and converts them into code data. The code data from the main memory 19 of the facsimile device 5 is transmitted to the host computer 1 via the fax server 3.

When the code data from the facsimile device 5 is received on the host computer 1, the host computer 1 uses the OCR function to recognize the received code data so that the code data is converted into the task processing data (the name of the customer, the date of the birth and/or the certificate number) and the kind of task (the task number). The host computer 1 performs an inquiry task processing procedure to produce processed data for the task processing data, the inquiry task processing procedure being identified by the kind of task (the task number). An application program needed to execute the inquiry task processing procedure, which is provided in the application program 6, is started. The processed data is produced by searching for corresponding customer data stored in the database 7.

The host computer 1 transmits code data, derived from the processed data, to the facsimile device 5 via the fax server 3.

When the code data from the host computer 1 is received on the facsimile device 5, the visual data of the received code data is displayed on the LCD 12. The operator can view the contents of the processed data for the task processing data on the LCD 12.

For example, FIG. 6 shows an example of customer information for the customer indicated at the column "B" of the input pattern sheet in FIG. 5. As shown, if the task processing data containing at least the hand-written certificate number is input, the operator on the facsimile device 5 can easily obtain an answer to the inquiry as the processed data for the task processing data.

In the case of the data communication and processing system of the above embodiment, the processed data for the task processing data can be printed on a sheet of paper by using the printer unit 40, and can stored in a recording medium by using the FDD 17 or the HDD 11.

Further, in the case of the data communication and processing system of the above embodiment, a list of a number of customers is displayed on the LCD 12. If any of the customers of the list are selected by the operator and the task processing data containing the selected customers is input, the operator can obtain the processed data with respect to the selected customers from the host computer 1. In addition, an output pattern sheet in which the processed data with respect to the selected customers are filled can be printed.

Next, a description will be given of another case in which the data communication and processing system of the above embodiment is applied to the estimation task processing with reference to FIGS. 7 and 8.

FIG. 7 shows another example of the OCR input pattern sheet read by the facsimile device 5 to request the host computer 1 to perform the estimation task processing. In FIG. 7, the OCR input pattern sheet is prepared in a predetermined form.

On the input pattern sheet in FIG. 7, a task number column "TASK NO." defines the kind of task, and a number of other columns indicates customer data which defines the task processing data. The task number "02" which is assigned to the estimation task is hand-written at the task number column "TASK NO.". A type of the insurance contract, a date of the birth of the customer, a date at start of the insurance contract, a year at end of the payment, a period being deferred, a period of insurance, an amount being paid, etc. are hand-written at the other columns.

The above input pattern sheet, shown in FIG. 7, is set on the scanner unit 41 of the facsimile device 5.

When the start key of the facsimile device 5 is depressed, the scanner unit 41 is controlled to read out image data from the input pattern sheet and input the image data to the IOCU 30 of the facsimile device 5. The image data of the input pattern sheet is stored in the DPRAM 31. The image data from the DPRAM 31 is transferred to the main memory 19 via the IOCU I/F 21.

The main CPU 18 uses the OCR function to recognize the task processing data (the type of the insurance contract, the date of the birth of the customer, etc.) and the kind of task (the task number) from the image data, and converts them into code data.

The image data stored in the main memory 19 is converted into visual data by the graphics controller 26 so that the visual data is displayed on the LCD 12. For example, FIG. 8 shows an example of customer information for the customer indicated by the input pattern sheet in FIG. 7.

The image data displayed on the LCD 12 can be checked by the operator on the facsimile device 5. If the result of the recognition is found as being an error, or if inserting any additional data to the image data of the input pattern sheet is desired, a desired option among the options of the operation menu on the touch panel 14 can be selected by using the touch panel 14 and the ten-key 13. When the desired option is selected, a corresponding procedure for altering the image data of the input pattern sheet or for adding any additional data thereto is carried out.

The code data from the main memory 19 of the facsimile device 5 is transmitted to the host computer 1 via the fax server 3.

When the code data from the facsimile device 5 is received on the host computer 1, the host computer 1 uses the OCR function to recognizes the received code data so that the code data is converted into the task processing data (the type of the insurance contract, the date of the birth, etc.) and the kind of task (the task number). The host computer 1 performs an estimation task processing procedure to produce processed data for the task processing data, the estimation task processing procedure being identified by the kind of task (the task number). An application program needed to execute the estimation task processing procedure, which is provided in the application program 6, is started. The processed data (the result of the estimation task processing) is produced by searching for corresponding insurance contract data of the database 7.

The host computer 1 transmits code data, derived from the processed data, to the facsimile device 5 via the fax server 3.

When the code data from the host computer 1 is received on the facsimile device 5, the visual data of the received code data is displayed on the LCD 12. The operator can view the contents of the processed data for the task processing data on the LCD 12.

Further, as described above, in the case of the data communication and processing system of the above embodiment, the processed data from the host computer 1 can be printed on the sheet of paper by using the printer unit 40, and can be stored in the recording medium by using the FDD 17 or the HDD 11.

When the printer unit 40 has a data overlay function, it is possible for the data communication and processing system of the above embodiment to produce a printed output pattern sheet on which the processed data is printed in an overlaying manner in accordance with a predetermined format of the output pattern sheet.

Next, a description will be given of a data communication and processing system in another embodiment of the present invention, with reference to FIGS. 9 through 18.

In the system of the previously-described embodiment, image data containing task processing data and a kind of task, which are hand-written on an input pattern sheet, is input to the facsimile device. The task processing data and the kind of task are recognized from the image data by using the OCR function. The task processing data and the kind of task are converted into code data, and the code data generated by the facsimile device is transmitted to the host computer via the telephone line.

However, the input pattern sheet includes frame lines and notes, other than the task processing data and the kind of task. The frame lines and the notes are usually printed on the input pattern sheet to provide a guidance for the insertion of input data. When the task processing data and the kind of task are recognized from the image data by using the optical character recognition (OCR) function, the code data generated by the facsimile device of the previous embodiment as a result of the OCR includes the data of the frame lines and the notes too. Thus, it is necessary for the facsimile device of the previous embodiment to eliminate the undesired data from the generated code data before the code data is transmitted. There is a problem that it is difficult to efficiently process the image data of the input pattern sheet as the elimination of the undesired data from the generated code data requires a complicated data processing.

The following embodiment provides an improved data communication and processing system in which the optical character recognition of task processing data and a kind of task from image data on an input pattern sheet is efficiently performed by using an exclusion color setting function of the facsimile device.

Figure 9:
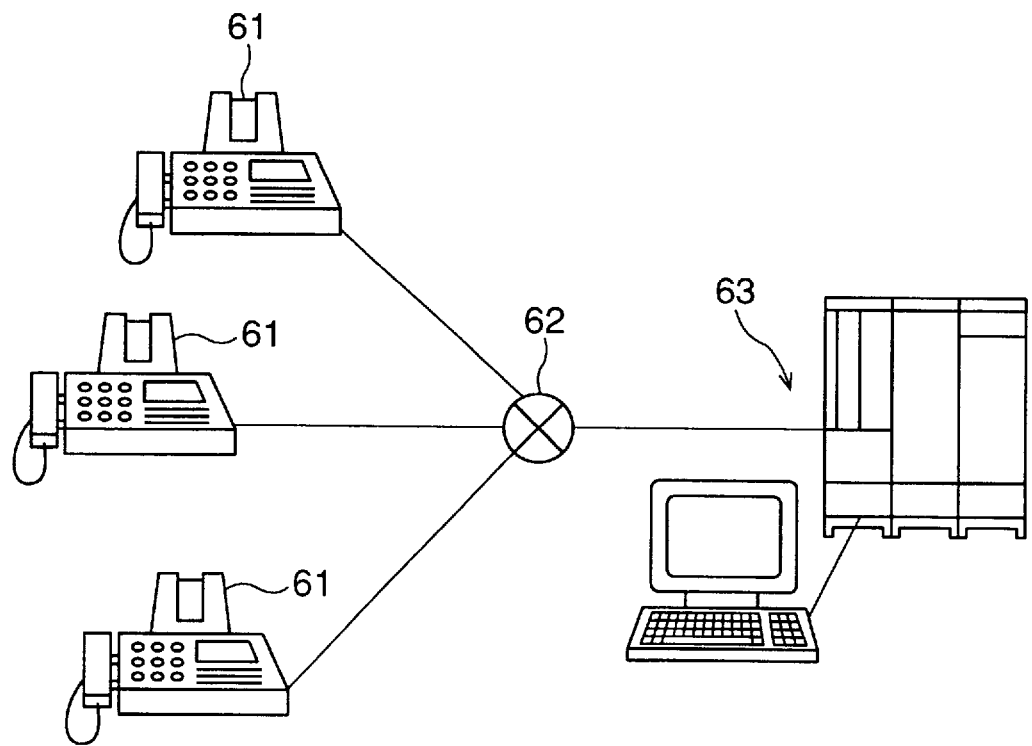
FIG. 9 is a diagram of a data communication and processing system in another embodiment of the present invention.

FIG. 9 shows a construction of the data communication and processing system of the present embodiment. In the data communication and processing system, as shown in FIG. 9, a plurality of facsimile devices 61 at user locations and a host computer 63 at a data processing center are linked via a telephone line 62.

Figure 10:
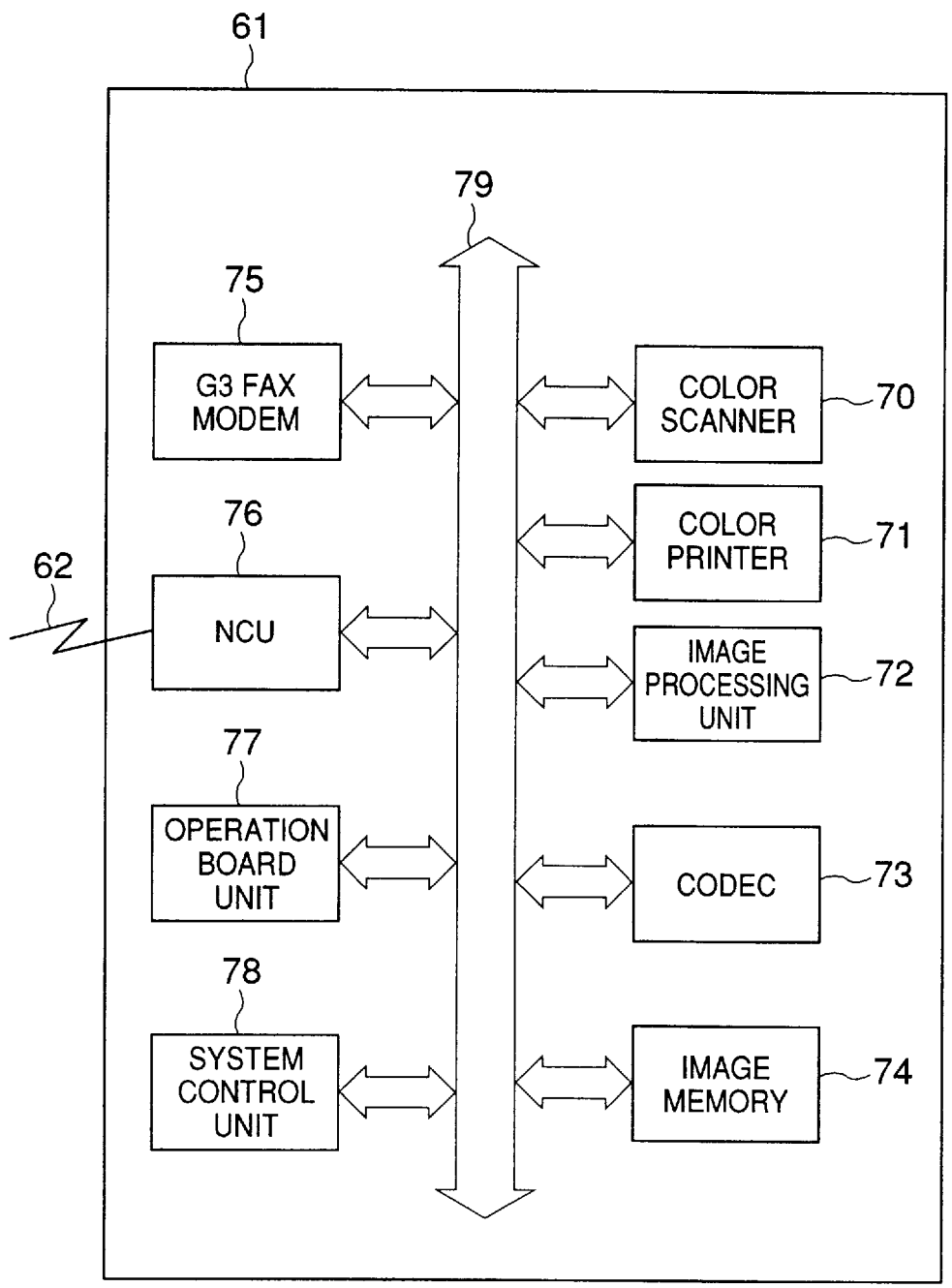
FIG. 10 is a block diagram of a construction of a facsimile device of the data communication and processing system in FIG. 9.

FIG. 10 shows a construction of one of the facsimile devices 61 in FIG. 9. Referring to FIG. 10, the facsimile device 61 generally has a color scanner 70, a color printer 71, an image processing unit 72, a coder/decoder unit (CODEC) 73, an image memory 74, a G3 fax modem 75, a network control unit (NCU) 76, an operation board unit 77, and a system control unit 78. These elements 70 through 78 are interconnected by a data bus 79.

Similarly to the previous embodiment of FIG. 2, the color scanner 70 of the present embodiment inputs image data containing task processing data and a kind of task by using an input pattern sheet. In the present embodiment, the task processing data and the kind of task are written on the input pattern sheet in a color other than an exclusion color, and other data items of the input pattern sheet are printed in the exclusion color. The color scanner unit 70 inputs the image data to the facsimile device 61 by using the above input pattern sheet.

Similarly to the operation board of the previous embodiment of FIG. 2, the operation board unit 77 of the present embodiment includes a keyboard and a display which correspond to the ten-key 13 and the touch panel 14.

The other construction of the facsimile device 61 of the present embodiment is essentially the same as the corresponding construction of the facsimile device 5 of the previous embodiment in FIG. 2, and a description thereof will be omitted.

Figure 11:
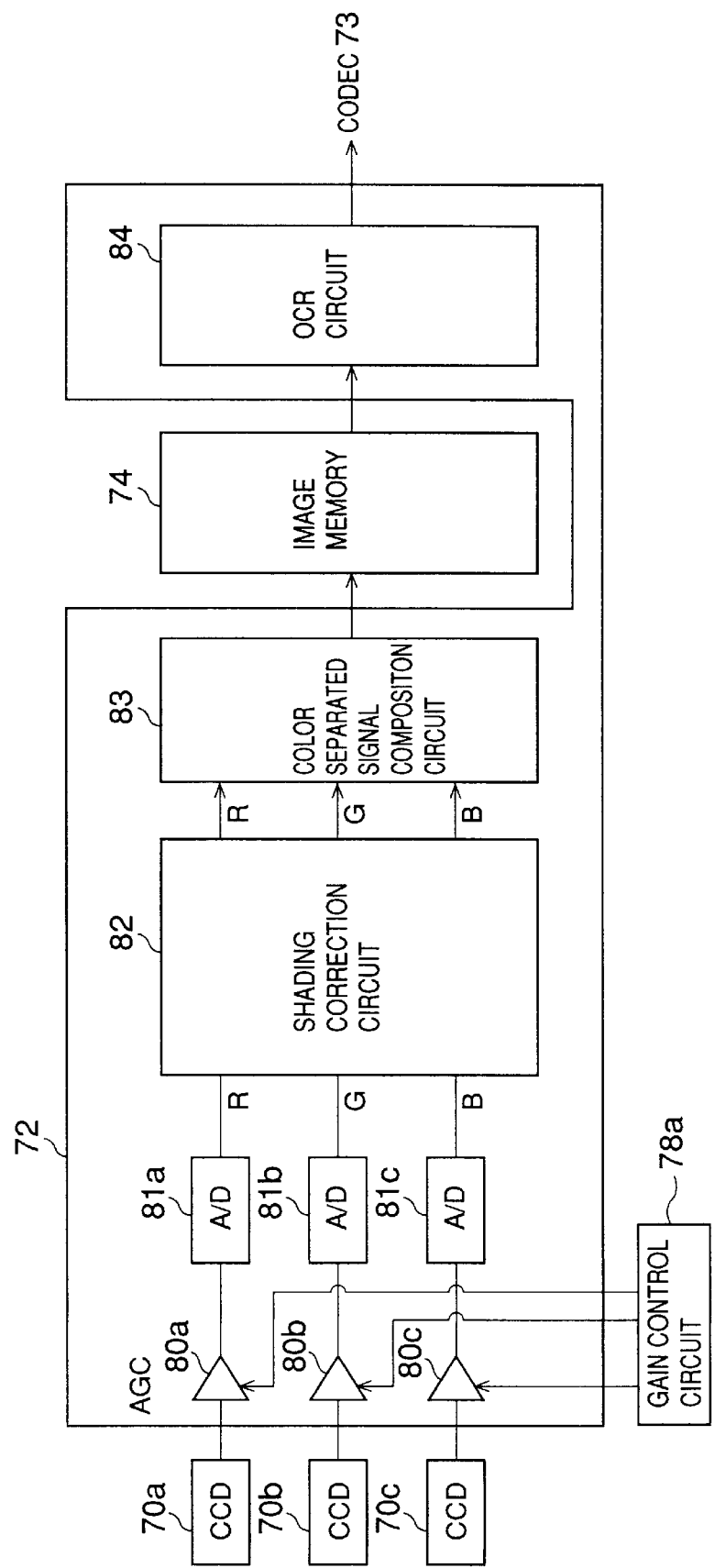
FIG. 11 is a block diagram of a construction of an image processing unit of the facsimile device in FIG. 10.

FIG. 11 shows a construction of the color scanner 70, the image processing unit 72 and the image memory 74 of the facsimile device 61 in FIG. 10. Referring to FIG. 11, the color scanner 70 includes charge-coupled devices (CCDs) 70a, 70b and 70c which generate a plurality of color separated image signals for colors of red (R), green (G) and blue (B), respectively, from a color image on the input pattern sheet.

Referring to FIG. 11, the image processing unit 72 includes automatic gain control (AGC) circuits 80a, 80b and 80c, analog-to-digital converters (A/D) 81a, 81b and 81c, a shading correction circuit 82, a color-separated signal composition circuit 83, and an optical character recognition (OCR) circuit 84. The outputs of the CCDs 70a–70c of the color scanner 70 are connected to the first inputs of the AGC circuits 80a–80c, and the outputs of the AGC circuits 80a–80c are connected to the inputs of the A/D converters 81a–81c.

The system control unit 78 of the facsimile device 61 in FIG. 10 includes a gain control circuit 78a. As shown in FIG. 11, the outputs of the gain control circuit 78a are connected to the second inputs of the AGC circuits 80a–80c.

Further, as shown in FIG. 11, the output of the color separated signal composition circuit 83 is connected to the input of the image memory 74 in FIG. 10.

The shading correction circuit 82 inputs digital image signals from the A/D converters 81a–81c and outputs corrected image signals to the composition circuit 83. The corrected image signals are generated so as to eliminate variations of the sensitivities of the CCDs 70a–70c.

The color separated signal composition circuit 83 inputs the corrected color separated image signals from the shading correction circuit 82 and outputs image data by composition of the color separated image signals. The image data from the composition circuit 83 is temporarily stored in the image memory 74.

The image data, read out from the image memory 75, is input to the OCR circuit 84. The OCR circuit 84 of the image processing unit 72 provides an OCR function to recognize the task processing data and the kind of task from the input image data, which is the same as the OCR function of the main CPU 18 of the previous embodiment of FIG. 2. The code data of the task processing data and the kind of task as a result of the OCR function from the OCR circuit 84 is input to the CODEC 73.

The CODEC 73 provides a data compression function of the code data from the image processing unit 72. The compressed data from the CODEC 73 is input to the NCU 76. The NCU 76 of the facsimile device 61 is linked to the host computer 63 via the telephone line 62. The code data of the task processing data and the kind of task from the facsimile device 61 is transmitted to the host computer 63 via the telephone line 62. The system control unit 78 controls the operation of the entire facsimile device 61.

In the present embodiment, the system control unit 78 and the image processing unit 72 constitute a recognizing unit which recognizes the task processing data and the kind of task from the image data from the color scanner 70, and converts the task processing data and the kind of task into code data.

As described above, the color scanner 70 includes the CCDs 70a–70c which generate a plurality of color separated image signals from a color image on the input pattern sheet, and input the color separated image signals to the AGC circuits 80a–80c of the image processing unit 72.

The gain control circuit 78a of the system control unit 78 is coupled to the second inputs of the AGC circuits 80a–80c. The gain control circuit 78a inhibits the inputting of one of the color separated image signals (R, G, B) from the CCDs 70a–70c to the AGC circuits 80a–80c, so that only the remaining color separated image signals, other than the above one of the color separated image signals, are allowed to be input. The above one of the color separated image signals corresponds to the exclusion color for the other data items on the input pattern sheet.

Similarly to the previous embodiment of FIG. 2, the facsimile device 61 of the present embodiment includes the operation board unit 77 which inputs a predetermined color so that the exclusion color for the input pattern sheet is set at the predetermined color.

For example, when the operator inputs data of red (R) as the predetermined color by using the operation board unit 77, the gain control circuit 78a outputs an ON signal to the AGC circuit 80a and outputs OFF signals to the AGC circuits 80b and 80c. The inputting of the color separated image signal (R) from the CCD 70a to the image processing unit 72 via the AGC circuit 80a is inhibited due to the gain-controlled amplification by the AGC circuit 80a. The inputting of only the remaining color separated image signals (G, B) from the CCDs 70b and 70c to the image processing unit 72 via the AGC circuits 80b and 80c are allowed.

Figure 12:
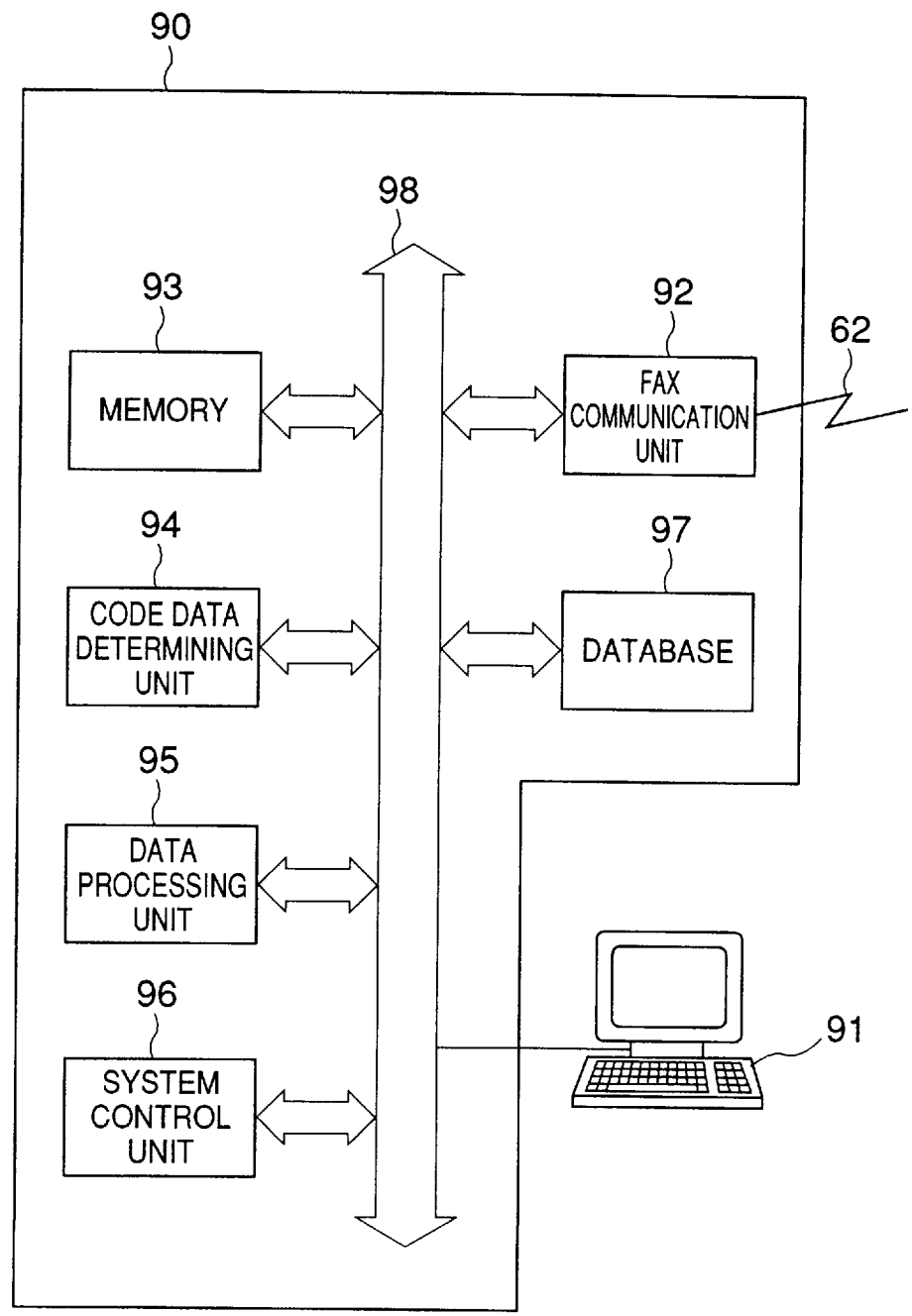
FIG. 12 is a block diagram of a construction of a host computer of the system in FIG. 9.

FIG. 12 shows a construction of the host computer 63 in FIG. 9. As shown in FIG. 12, the host computer 63 generally has a main part 90 and a personal computer 91 connected to the main part 90.

Referring to FIG. 12, the main part 90 includes a fax communication unit 92, a memory 93, a code data determining unit 94, a data processing unit 95, a system control unit 96, and a database 97. These elements 92 through 97 are interconnected by a data bus 98.

The data bus 98 is used to send and receive data between the elements 92 through 97 of the host computer 63.

The fax communication unit 92 transmits code data to and receives code data from one of the facsimile devices 61 via the telephone line 62 by using a facsimile communication function.

The memory 93 is a disk device for storing the code data which is transmitted and received between the facsimile device 61 and the host computer 63. The memory 93 is, for example, an optical disk device.

The code data determining unit 94 reads out code data of the task processing data and the kind of task from the memory 93, and converts the code data into the task processing data and the kind of task. The code data determining unit 94 detects the task processing data and the kind of task which are received from the facsimile device 61.

The data processing unit 95 performs a task processing procedure to produce processed data for the task processing data which is detected by the code data determining unit 94, the task processing procedure identified by the kind of task which is detected by the code data determining unit 94. When it is needed for the task processing procedure identified by the kind of task, relevant data stored in the database 97 is searched for by the data processing unit 95 when the task processing procedure is performed.

The system control unit 96 controls the operation of the entire host computer 63. The system control unit 96 controls the fax communication unit 92 to transmits code data of the processed data, produced by the data processing unit 95, to the facsimile device 61 via the telephone line 62.

Figure 13:
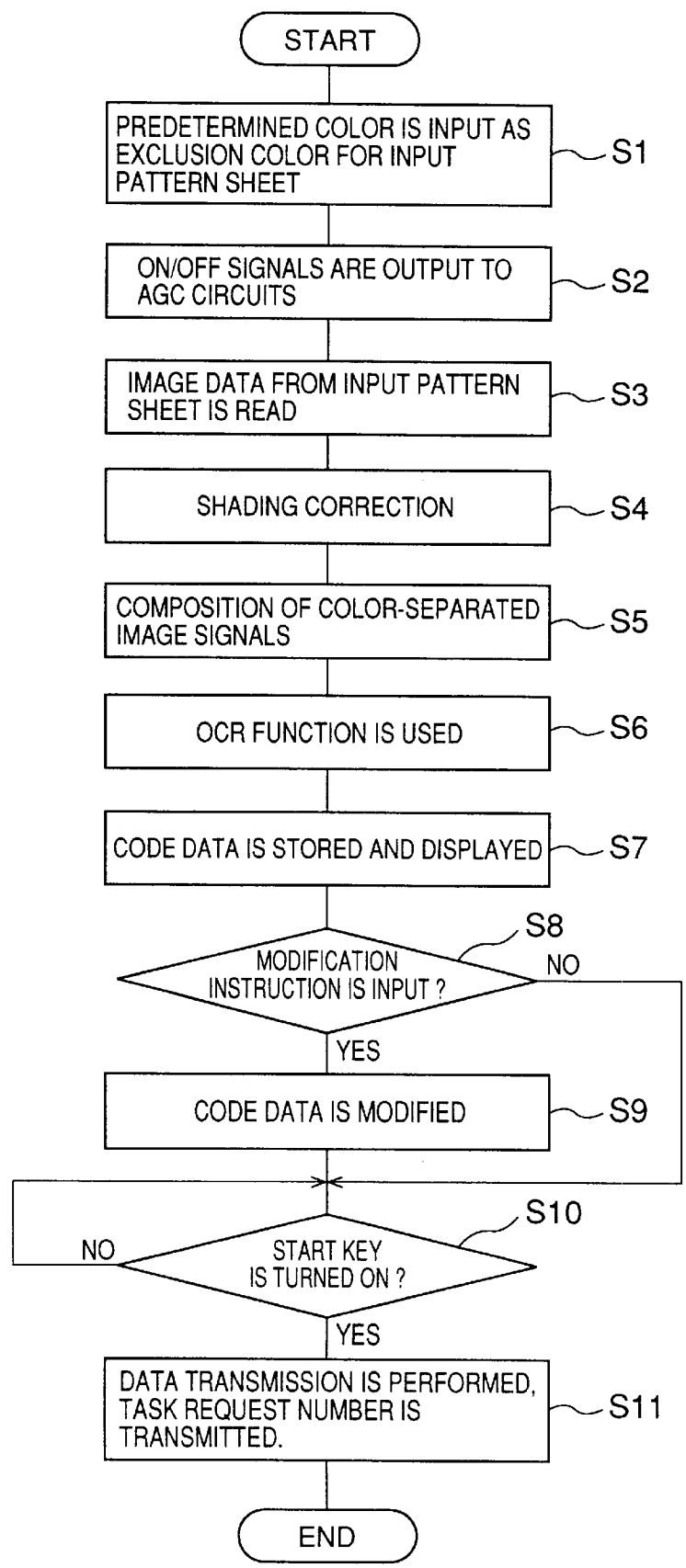
FIG. 13 is a flowchart for explaining a data transmission procedure performed by the facsimile device.

FIG. 13 shows a data transmission procedure performed by the facsimile device 61 of the present embodiment. The data transmission procedure in FIG. 13 is carried out by the system control unit 78 of the facsimile device 61 in order to transmit the code data of the task processing data and the kind of task, from the facsimile device 61 to the host computer 63 via the telephone line 62.

Referring to FIG. 13, step S1 detects that the input pattern sheet is set on the color scanner 70. Also, step S1 detects that a predetermined color among the primary colors R, G and B is input as the exclusion color by using the operation board unit 77. The system control unit 78 sets the exclusion color for the input pattern sheet at the predetermined color, which will be described at step S2 below.

Step S2 controls the gain control circuit 18*a* to output an ON signal to one of the AGC circuits 80*a*–80*c*. The above one of the AGC circuits 80*a*–80*c* is selected by the predetermined color which is input from the operation board unit 77. The amplification of one color-separated image signal from the color scanner 70 by the above one of the AGC circuits 80*a*–80*c* is turned ON by the ON signal, but the amplifications of the other color-separated image signals from the color scanner 70 by the other AGC circuits are OFF.

After the amplifications of image data signals by the AGC circuits 80*a*–80*c* are set by the gain control unit 78*a*, step S3 transports the input pattern sheet on the color scanner 70, and reads image data from the input pattern sheet by using the color scanner 70.

When reading the image data from the input pattern sheet by the color scanner 70, the image processing unit 72 is controlled such that inputting one (corresponding to the predetermined color) of the color separated image data signals from the color scanner 70 to corresponding one of the A/D converters 81*a*–81*c* is inhibited by the above one of the AGC circuits 80*a*–80*c* whose amplification is turned ON, and inputting the other color separated image data signals to the other A/D converters are allowed.

The A/D converters 81*a*–81*c* (actually, two of them) convert the image data signals from the AGC circuits 80*a*–80*c* (actually, two of them) into digital signals, and the digital signals from the A/D converters 81*a*–81*c* are input to the shading correction circuit 82.

Step S4 controls the shading correction circuit 82 to provide the shading correction for the digital signals from the A/D converters 81*a*–81*c*. The corrected color-separated image signals from the shading correction circuit 82 are input to the color separated signal composition circuit 83.

Step S5 controls the color-separated signal composition circuit 83 to provide the composition of the corrected color-separated image signals from the shading correction circuit 82. The image data from the color-separated signal composition circuit 83 is stored in the image memory 74.

Step S6 controls the image memory 74 and the OCR circuit 84 so that the image data is read out from the image memory 74 at a predetermined rate and the image data read out from the image memory 74 is input to the OCR circuit 84. Also, step S6 controls the OCR circuit 84 to generate the code data of the task processing data and the kind of task from the image data by using the optical character recognition (OCR) function.

Step S7 controls the OCR circuit 84 and the operation board unit 77 so that visual data of the code data as the result of the OCR function is displayed on the operation board unit 77. The code data as the result of the OCR function is stored in the image memory 74.

Step S8 detects whether an image data modification instruction to modify the code data, stored in the image memory 74, is input by the operator by using the operation board unit 77 when the visual data of the code data is displayed on the operation board unit 77.

When the result at the step S8 is affirmative, step S9 controls the image memory 74 so that the code data stored in the image memory 74 is modified in accordance with the image data modification instruction, and the modified code data is stored again in the image memory 74. After the step S9 is performed, step S10 is performed.

On the other hand, when the result at the step S8 is negative, the above step S9 is not performed and step S10 is performed.

Step S10 detects whether a start key (not shown) of the operation board unit 77 is turned ON after a predetermined fax number of the host computer 63 is input by using the operation board unit 77.

When the result at the step S10 is affirmative, step S11 is performed. When the result at the step S10 is negative, the step S10 is repeated until the result at the step S10 becomes affirmative.

Step S11 controls the G3 FAX MODEM 75 and the NCU 76 so that the host computer 63 is called by the NCU 76 over the telephone line 62, and the code data of the task processing data and the kind of task, which is stored in the image memory 74 as the result of the OCR function, is transmitted from the facsimile device 61 to the host computer 63 via the telephone line 62.

Also, step Sl controls the G3 FAX MODEM 75 and the NCU 76 so that code data of a task request number is transmitted from the facsimile device 61 to the host computer 63 via the telephone line 62. The facsimile device 61 assigns a serial number as the task request number to each of a number of task processing requests which are sent to the host computer 63. In other words, the task request number generated by the facsimile device 61 is, for example, 001 for a first task processing request, 002 for a second task processing request, etc. The task request number is used by the host computer 63 to identify a specific one of the task processing requests.

After the above step S11 is performed, the data transmission procedure in FIG. 13 is finished.

Figure 14:
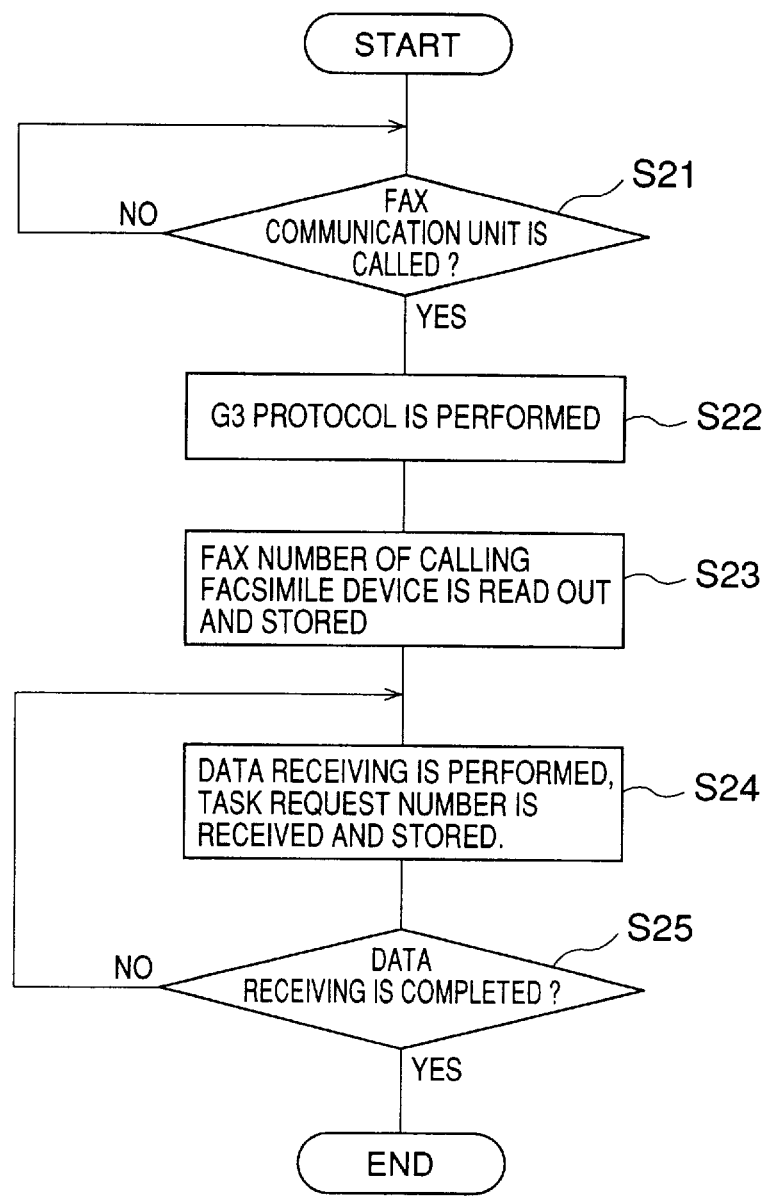
FIG. 14 is a flowchart for explaining a data receiving procedure performed by the host computer.

FIG. 14 shows a data receiving procedure performed by the host computer 63. The data receiving procedure in FIG. 14 is carried out by the system control unit 96 of the host computer 63 in order to receive the code data from the facsimile device 61 via the telephone line 62.

Referring to FIG. 14, step S21 detects whether the fax communication unit 92 is called by the facsimile device 61 over the telephone line 62. When the result at the step S21 is affirmative, step S22 is performed. Otherwise the step S21 is repeated.

Step S22 performs a predetermined G3 protocol to establish a communication path between the host computer 63 and the facsimile device 61.

When the step S22 is being performed, step S23 reads out a fax number of the calling facsimile device 61 and stores the read-out facsimile number in the memory 93.

After the communication path is established, step S24 receives the code data of the task processing data and the kind of task from the facsimile device 61 via the telephone line 62, and stores the received code data in the memory 93. Also, step S24 receives the code data of the task request number from the facsimile device 61 via the telephone line 62, and stores the received code data in the memory 93.

When the step S24 is being performed, step S25 detects whether the data receiving procedure is completed. When the result at the step S25 is negative, the above step S24 is continuously performed. Otherwise the fax communication unit 92 is disconnected from the telephone line 62, the host computer 63 is set at a waiting condition, and the data receiving procedure in FIG. 14 ends.

Figure 15:
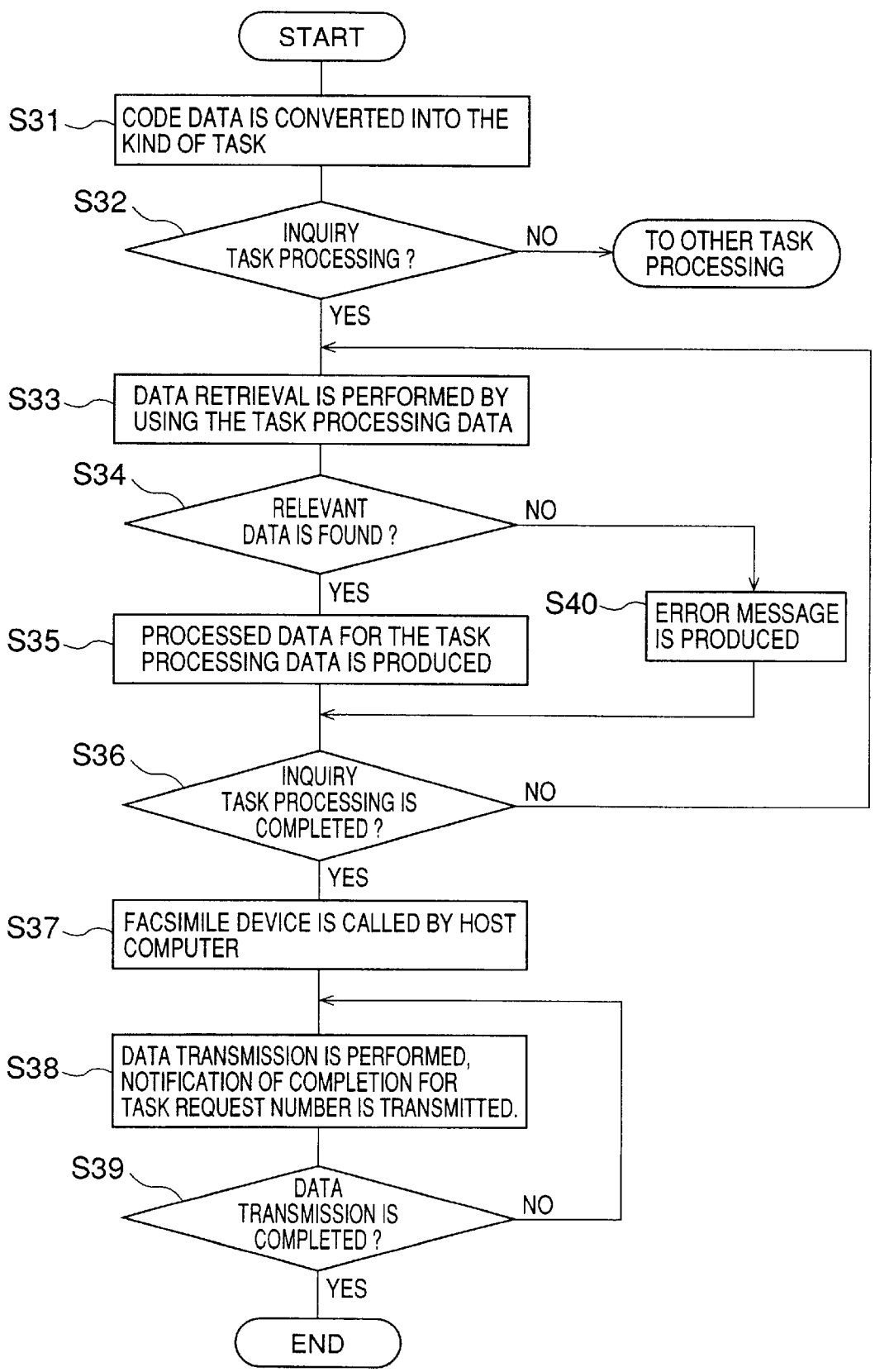
FIG. 15 is a flowchart for explaining a task processing procedure performed by the host computer.

FIG. 15 shows a task processing procedure performed by the host computer 63. The task processing procedure in FIG.

15 is carried out by the system control unit 96 of the host computer 63 in order to produce processed data for the task processing data received from the facsimile device 61. In the following description, it is supposed that an inquiry task processing is requested by the facsimile device 61 to the host computer 63.

Referring to FIG. 15, step S31 reads out the code data of the kind of task from the memory 93, and converts the code data into the kind of task, in order to detect what kind of task is requested by the facsimile device 61.

Step S32 detects whether the requested task processing is the inquiry task processing. When the result at the step S32 is negative, the procedure is transferred to another task processing procedure. Otherwise step S33 is performed.

Step S33 reads out the code data of the task processing data from the memory 93, and converts the code data into the task processing data. Also, step S33 performs a data retrieval for the customer data, stored in the database 97, by using the task processing data. Generally, at this step S33, an inquiry task processing procedure identified by the kind of task is performed.

Step S34 detects whether relevant data is found in the customer data of the database 97 as a result of the data retrieval at the step S33.

When the result at the step S34 is affirmative, step S35 produces the processed data for the task processing data as the result of the data retrieval. The processed data is converted into code data, and the code data is inserted into transmitting data which is to be transmitted to the facsimile device 61.

On the other hand, when the result at the step S34 is negative, step S40 produces an error message. The error message is converted into code data, and the code data is inserted into the transmitting data.

When either the step S35 or the step S40 is performed, step S36 detects whether the above inquiry task processing procedure is completed. When the result at the step S36 is negative, the above steps S33 and S34 are repeated until the above inquiry task processing procedure is completed.

When the result at the step S36 is affirmative, step S37 calls the facsimile device 61 by using the stored facsimile number of the facsimile device 61 in the memory 93.

After a communication path between the host computer 63 and the facsimile device 61 is established, step S38 transmits the code data of the processed data to the facsimile device 61 via the telephone line 62 by using the facsimile communication unit 92. Since the task request number identifying the task processing request by the facsimile device 61 is stored in the memory 93, a notification of the completion of the task processing procedure is transmitted, at the step S38, by the host computer 63 to the facsimile device 61 via the telephone line 62 by using the stored task request number.

Step S39 detects whether the data transmitting procedure at the step S38 is completed. When the result at the step S39 is negative, the step S38 is continuously performed. Otherwise the task processing procedure shown in FIG. 15 ends.

Figures 16, 17:
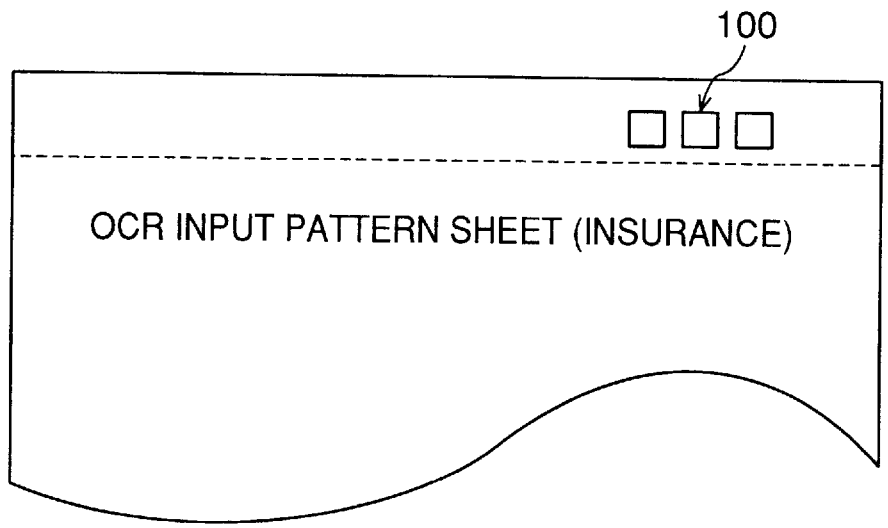
FIG. 16 is a diagram of an exclusion color setting portion of an input pattern sheet.
FIG. 17 is a diagram of an example of the manner of setting an exclusion color of the input pattern sheet in FIG. 16.

FIG. 16 shows an exclusion color setting portion of the input pattern sheet which is used by the facsimile device 61. As shown in FIG. 16, the input pattern sheet has an exclusion color setting portion 100 at an upper corner of the input pattern sheet. The exclusion color setting portion 100 includes three rectangular boxes, one of which is selectively smudged or printed in order to set an exclusion color (or drop-out color) of the input pattern sheet. The rectangular boxes of the exclusion color setting portion 100 respectively correspond to three primary colors; that is, red, green and blue.

When reading the input pattern sheet by using the color scanner 70 of the facsimile device 61, the smudged one of the rectangular boxes of the exclusion color setting portion 100 is detected. The exclusion color is set according to the result of the detection.

FIG. 17 shows an example of the manner of setting the exclusion color by using the input pattern sheet in FIG. 16. In this example, as shown in FIG. 17, when the left box of the exclusion color setting portion 100 of the input pattern sheet is smudged or printed, red (R) is set as the exclusion color. When the middle box of the exclusion color setting portion 100 is smudged or printed, green (G) is set as the exclusion color. When the right box of the exclusion color setting portion 100 is smudged or printed, blue (B) is set as the exclusion color.

Figure 18:
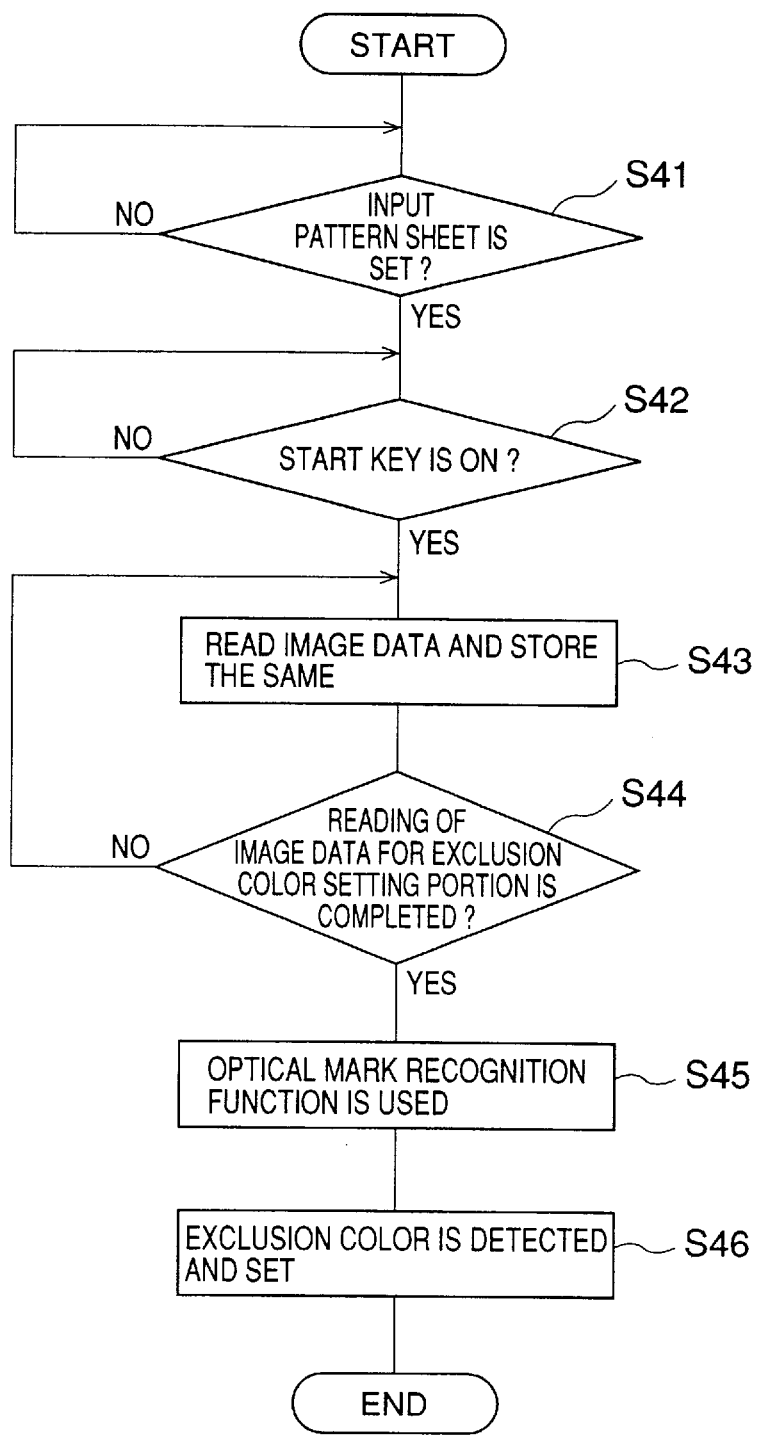
FIG. 18 is a flowchart for explaining an exclusion color setting procedure performed by the facsimile device.

FIG. 18 shows an exclusion color setting procedure performed by the facsimile device 61. The exclusion color setting procedure in FIG. 18 is automatically carried out by the system control unit 78 of the facsimile device 61 when image data of the input pattern sheet is read by using the color scanner 70. The exclusion color setting procedure in FIG. 18 corresponds to the steps S1 and S2 of the data transmission procedure in FIG. 13. Accordingly, by carrying out the exclusion color setting procedure in FIG. 18, the system control unit 78 of the facsimile device 61 of the present embodiment detects an exclusion color pattern of the input pattern sheet and sets the exclusion color in accordance with a result of the detection.

Referring to FIG. 18, step S41 detects whether the input pattern sheet is set on the color scanner 70. When the result at the step S41 is affirmative, step S42 is performed. Otherwise the step S41 is repeated until the input pattern sheet is detected to be on the color scanner 70.

Step S42 detects whether the start key of the operation board unit 77 is ON. When the result at the step S42 is affirmative, step S43 is performed. Otherwise the step S42 is repeated until the start key is ON.

Step S43 controls the color scanner 70 so that the input pattern sheet is transported and image data from the input pattern sheet is read out by the color scanner 70. Also, the step S43 controls the color scanner 70 so that the image data, read from the input pattern sheet, is stored in the image memory 74 in a sequential manner.

Step S44 detects whether the reading of image data for a region of the exclusion color setting portion 100 in the input pattern sheet by the color scanner 70 is completed. When the result at the step S44 is affirmative, performing the above step S43 is stopped and step S45 is performed. Otherwise the above step S43 is repeated until all the image data from the input pattern sheet is read out by the color scanner 70.

Step S45 controls the image processing unit 72 to detect which of the rectangular boxes of the exclusion color setting portion 100 of the input pattern sheet is smudged or printed, by using an optical mark recognition (OMR) function.

After the above step S45 is performed, step S46 determines the exclusion color in accordance with the result of the detection (or the OMR function) at the step S45. Thus, in the image processing unit 72, the exclusion color is set by using the input pattern sheet. Also, the step S46 controls the gain control circuit 78a so that an ON signal from the gain control circuit 78a is sent to one of the AGC circuits 80a–80c which corresponds to the determined exclusion color. The amplification of the image data signal by the corresponding one of the AGC circuits 80*a*–80*c* is turned ON by the ON signal and the amplifications of the image data signals by the other AGC circuits are OFF. Thus, the exclusion color setting procedure is automatically carried out by the facsimile device 61.

After the above step S46 is performed, the reading of image data for the remaining region of the input pattern sheet by the color scanner 70 is re-started. That is, the procedure performed by the system control unit 78 is transferred to the step S3 of the procedure shown in FIG. 13.

In the above-described exclusion color setting procedure, the exclusion color of the input pattern sheet is set according to the position of the smudged or printed box in the exclusion color setting portion 100. Alternatively, it is also possible that the exclusion color setting is automatically carried out by using an input pattern sheet on which a specific character or sign indicating the exclusion color is hand-written at a predetermined position and using the OCR function to recognize the hand-written character of the input pattern sheet. Further, it is possible that the exclusion color setting is automatically carried out by using an input pattern sheet on which a predetermined position is smudged in a predetermined color and using the recognition of the predetermined color as the exclusion color.

Further, in the above-described embodiment, a bar code sheet or a mark sheet as well as the input pattern sheet can be used to carry out the exclusion color setting procedure.

Figure 19:
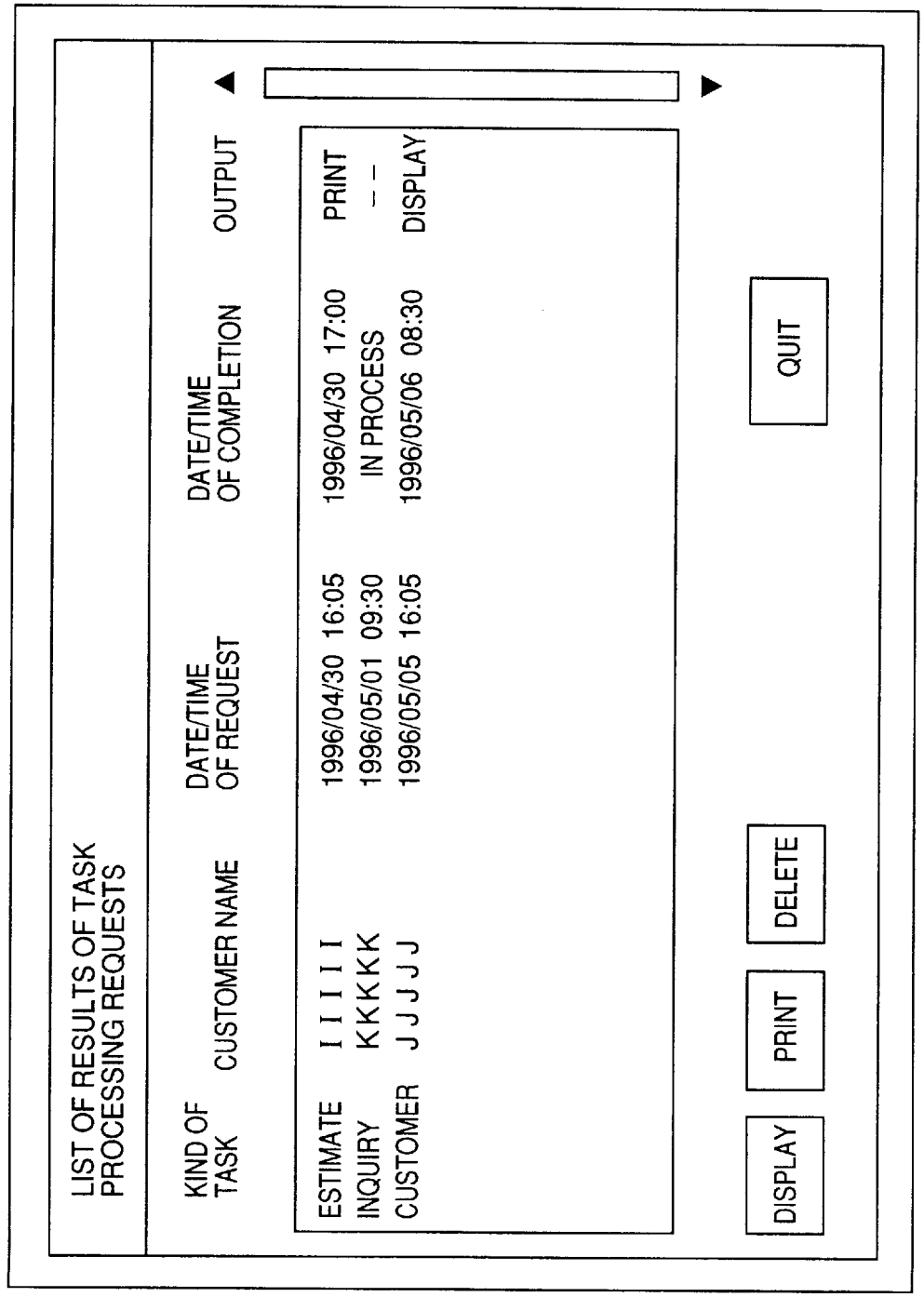
FIG. 19 is a diagram of a list of results of task processing requests displayed in response to the task processing requests.

FIG. 19 shows a list of results of task processing requests which is displayed on the operation board unit 77 of the facsimile device 61 in response to the task processing requests input by the operator.

When transmitting the code data of the task processing data and the kind of task for one of a plurality of task processing requests, from the facsimile device 61 to the host computer 63, the one of the task processing requests is identified by a task request number allocated to each task processing request, as described above.

As shown in FIG. 19, for each of the task processing requests, relevant data of the task processing request, containing the task processing data, the kind of task, the data/time of the request, the date/time of the completion of the task processing, etc., is inserted to the list of the results of the task processing requests.

The list of the results of the task processing requests is capable of being displayed on the operation board unit 77 at any time when a related option among a number options of an operation menu on the operation board unit 77 is selected.

As shown in FIG. 19, when a notification of the completion of the task processing procedure is already sent to the facsimile device 61, the relevant data of the date/time of the completion is filled in the list of the results of the task processing requests. When the task processing procedure is still being performed and not completed by the host computer 63, the column of the date/time of the completion for the task processing request is indicated by "IN PROCESS" as in FIG. 19.

Further, the present invention is not limited to the above-described embodiments, and variations and modifications may be made without departing from the scope of the present invention.

What is claimed is:

1. A data communication and processing method for a system wherein a host computer and a data communication device are linked via a telephone line, said method comprising the steps of:

selecting a specified operation from among a plurality of operations identifying corresponding operation processing procedures to be performed by said host computer;

inputting image data containing operation processing data and the specified operation selected from among the plurality of operations to the data communication device;

recognizing the operation processing data and the specified operation from said image data;

converting said operation processing data and said specified operation into first code data;

transmitting said first code data from the data communication device to the host computer via the telephone line by using a data communication function;

receiving said first code data on the host computer from the data communication device;

converting said first code data into the operation processing data and the specified operation;

performing the operation processing procedure corresponding to the specified operation to produce processed data based on the operation processing data, said processed data being different from said operation processing data;

transmitting second code data different from said first code data and representative of said processed data from the host computer to the data communication device via the telephone line by using the data communication function, said second code data corresponding to the specified operation input to the data communication device; and receiving said second code data of said processed data on the data communication device from the host computer via the telephone line in response to said step of transmitting said first code data from the data communication device to the host computer.

2. The method according to claim 1, wherein said data communication device comprises a facsimile device.

3. The method according to claim 2, wherein said recognizing step is performed by the facsimile device by using an optical character recognition function.

4. The method according to claim 3, further comprising the steps of:

displaying visual data of said first code data on a display unit of the facsimile device; and inputting a data transmission instruction by using an operation board of the facsimile device when said visual data is displayed, in order to transmit said first code data from the facsimile device to the host computer via the telephone line.

5. The method according to claim 3, further comprising the steps of:

displaying visual data of said first code data on a display unit of the facsimile device; and inputting an image data modification instruction by using an operation board of the facsimile device when said visual data is displayed, in order to modify the image data input by said inputting step.

6. A data communication and processing method for a system wherein a host computer and a data server are linked via a local area network, and a data communication device and the data server are linked via a telephone line, said method comprising the steps of:

selecting a specified operation from among a plurality of operations identifying corresponding operation processing procedures to be performed by said host computer;

inputting image data containing operation processing data and the specified operation selected from among the plurality of operations to the data communication device;

recognizing the operation processing data and the specified operation from said image data;

converting said operation processing data and said specified operation into first code data;

transmitting said first code data from the data communication device to the data server via the telephone line by using a data communication function;

transmitting said first code data from the data server to the host computer via the local area network;

receiving said first code data on the host computer from the data server;

converting said first code data into the operation processing data and the specified operation;

performing the operation processing procedure corresponding to the specified operation to produce processed data based on the operation processing data, said processed data being different from said operation processing data;

transmitting second code data different from said first code data and representative of said processed data from the host computer to the data server via the local area networks, said second code data corresponding to the specified operation input to the data communication device;

receiving said second code data of said processed data on the data server from the host computer;

transmitting said second code data of said processed data from the data server to the data communication device via the telephone line; and receiving said second code data of said processed data on the data communication device from the data server via the telephone line by using the data communication function in response to said step of transmitting said first code data from the data server to the host computer.

7. The method according to claim 6, wherein said data server comprises a fax server and said data communication device comprises a facsimile device.

8. The method according to claim 7, wherein said recognizing step is performed by the facsimile device by using an optical character recognition function.

9. The method according to claim 8, further comprising the steps of:

displaying visual data of said first code data on a display unit of the facsimile device; and inputting a data transmission instruction by using an operation board of the facsimile device when said visual data is displayed, in order to transmit said first code data from the facsimile device to the host computer via the telephone line.

10. The method according to claim 8, further comprising the steps of:

displaying visual data of said first code data on a display unit of the facsimile device; and inputting an image data modification instruction by using an operation board of the facsimile device when said visual data is displayed, in order to modify the image data input by said inputting step.

11. A data communication and processing system wherein a host computer and at least one data communication device are linked via a telephone line, said at least one data communication device comprising:

means for selecting a specified operation from among a plurality of operations identifying corresponding operation processing procedures to be performed by said host computer;

an input unit configured to input image data containing operation processing data and the specified operation selected from among the plurality of operations;

a recognizing unit configured to recognize the operation processing data and the specified operation from said image data from said input unit, and to convert said operation processing data and said specified task into first code data; and a first data communication unit configured to transmit said first code data from said recognizing unit to the host computer via the telephone line by using a data communication function, and to receive first code data from the host computer via the telephone line by using the data communication function, correspond said host computer comprising:

a second data communication unit configured to receive said first code data from the at least one data communication device via the telephone line, and to convert said first code data into the operation processing data and the specified operation; and a data processing unit configured to perform the operation processing procedure corresponding to the specified operation to produce processed data based on the operation processing data, said processed data being different from said operation processing data, said second data communication unit is further configured to transmit second code data different from said first code data and representative of said processed data from said data processing unit to the at least one data communication device via the telephone line by using a data communication function in response to a transmission of the first code data from the first data communication unit to the host computer, said second code data corresponding to the specified operation recognized by said recognizing unit.

12. The data communication and processing system according to claim 11, wherein said at least one data communication device comprises at least one facsimile device, said first data communication unit comprises a first facsimile communication unit, and said second data communication unit comprises a second facsimile communication unit.

13. The data communication and processing system according to claim 12, wherein said recognizing unit recognizes the operation processing data and the specific operation from the image data and generates said first code data from said operation processing data and said specific operation by using an optical character recognition function.

14. The data communication and processing system according to claim 13, wherein said first facsimile unit further comprises:

a display unit displaying visual data of said first code data thereon; and an operation board inputting a data transmission instruction by touching the operation board when said visual data is displayed on said display unit, in order to transmit said first code data from the facsimile device to the host computer via the telephone line.

15. The data communication and processing system according to claim 14, wherein said operation board inputs an image data modification instruction by touching the operation board when said visual data is displayed on said display unit, in order to modify the image data input by said input unit.

16. A data communication and processing system wherein a host computer and a fax server are linked via a local area network, and the fax server and at least one facsimile device are linked via a telephone line, said at least one facsimile device comprising:

an input unit inputting image data containing task processing data and a kind of task;

a recognizing unit recognizing the task processing data and the kind of task from the image data from said input unit, and converting said task processing data and said kind of task into code data; and a facsimile communication unit transmitting said code data from said recognizing unit to the fax server via the telephone line by using a facsimile communication function, said facsimile communication unit receiving code data from the fax server via the telephone line by using the facsimile communication function, said fax server comprising:

a facsimile communication unit receiving said code data from the facsimile device via the telephone line, and transmitting code data from the fax server to the facsimile device via the telephone line; and a LAN communication unit transmitting said code data from the fax server to the host computer via the local area network, and receiving code data from the host computer via the local area network, said host computer comprising:

a LAN communication unit receiving said code data from the fax server via the local area network, and converting said code data into the task processing data and the kind of task; and a data processing unit performing a task processing procedure to produce processed data for the task processing data, said task processing procedure identified by the kind of task, said LAN communication unit transmitting code data of said processed data from said data processing unit to the fax server via the local area network.

17. The data communication and processing system according to claim 16, wherein said recognizing unit recognizes the task processing data and the kind of task from the image data and generates said code data from said task processing data and said kind of task by using an optical character recognition function.

18. The data communication and processing system according to claim 17, wherein said facsimile unit further comprises:

a display unit displaying visual data of said code data thereon; and an operation board inputting a data transmission instruction by touching the operation board when said visual data is displayed on said display unit, in order to transmit said code data from the facsimile device to the host computer via the telephone line.

19. The data communication and processing system according to claim 18, wherein said operation board inputs an image data modification instruction by touching the operation board when said visual data is displayed on said display unit, in order to modify the image data input by said input unit.

20. A data communication and processing system including a data communication device, said data communication device being linked to an external station via a telephone line, and said external station including a host computer and a data server, said data communication device comprising:

means for selecting a specified operation from among a plurality of operations identifying corresponding operation processing procedures to be performed by said host computer;

an input unit configured to input image data containing operation processing data and the specified operation selected from among the plurality of operations;

a recognizing unit configured to recognize the operation processing data and the specified operation from the image data from said input unit, and to convert said operation processing data and said specified operation into first code data; and a first data communication unit configured to transmit said first code data from said recognizing unit to the external station via the telephone line by using a data communication function, and to receive second code data different from said first code data and representative of said processed data from the external station;

wherein said host computer of the external station comprises:

a second data communication unit configured to receive said first code data from the first data communication unit via the telephone line, and to convert said first code data into the operation processing data and the specified operation; and a data processing unit configured to perform the operation processing procedure corresponding to the specified operation to produce processed data based on the operation processing data, said processed data being different from said operation processing data, said second data communication unit is further configured to transmit second code data different from said first code data and representative of said processed data from said data processing unit to the first data communication unit via the telephone line by using a data communication function in response to a transmission of the first code data from the first data communication unit to the host computer, said second code data corresponding to the specified operation recognized by said recognizing unit.

21. A data communication and processing system wherein a host computer and at least one facsimile device are linked via a telephone line, said at least one facsimile device comprising:

an input unit inputting image data containing task processing data and a kind of task by using an input pattern sheet, the task processing data and the kind of task being written on the input pattern sheet in a color other than an exclusion color, and other data items of the input pattern sheet being printed in said exclusion color;

a recognizing unit recognizing the task processing data and the kind of task from said image data from said input unit, and converting said task processing data and said kind of task into code data; and a facsimile communication unit transmitting said code data from said recognizing unit to the host computer via the telephone line by using a facsimile communication function, said facsimile communication unit receiving code data from the host computer via the telephone line by using the facsimile communication function, said host computer comprising:

a facsimile communication unit receiving said code data from the facsimile device via the telephone line, and converting said code data into the task processing data and the kind of task; and a data processing unit performing a task processing procedure to produce processed data for the task processing data, said task processing procedure identified by the kind of task, said facsimile communication unit transmitting code data of said processed data from said data processing unit to the facsimile device via the telephone line by using a facsimile communication function.

22. The system according to claim 21, wherein said input unit comprises:

an image reading unit generating a plurality of color separated image signals from a color image on the input pattern sheet, and inputting the color separated image signals to said recognizing unit, and wherein said facsimile device further comprises:

a gain control unit, coupled to inputs of said recognizing unit, inhibiting the inputting of one of said color separated image signals from said image reading unit to said recognizing unit, so that only the remaining color separated image signals, other than said one of said color separated image signals, are allowed to be input, said one of said color separated image signals corresponding to said exclusion color for said other data items on said input pattern sheet.

23. The system according to claim 21, wherein said facsimile device further comprises:

an operation board unit inputting a predetermined color so that the exclusion color for the input pattern sheet is set at the predetermined color.

24. The system according to claim 21, wherein said facsimile device further comprises:

an exclusion color setting unit detecting an exclusion color pattern of the input pattern sheet and setting the exclusion color in accordance with a result of said detection.

25. A data communication device for a data communication and processing system, said data communication device being linked to an external station via a telephone line, and said external station including a host computer and a data server, said data communication device comprising: means for selecting a specified operation from among a plurality of operations identifying corresponding operation processing procedures to be performed by said external station;

an input unit configured to input image data containing operation processing data and the specified operation selected from among the plurality of operation;

a recognizing unit configured to recognized the operation processing data a specified operation from the image data from said input unit, and to convert said operation processing data and said specified operation into first code data; and a data communication unit configured to transmit said first code data from said recognizing unit to the external station via the telephone line by using a data communication function, and to receive second code data different from said first code data and representative of processed data produced according to the operation processing procedure corresponding to said specified operation, said processed data being different from said operation processing data, from the external station via the telephone line by using the data communication function in response to a transmission of the first code data from the data communication unit to the external station, said second code data corresponding to the specified operation recognized by said recognizing unit.

26. The data communication device according to claim 25, wherein said data server comprises a fax server, and said data communication unit comprises a facsimile communication unit.

27. The data communication device according to claim 26, wherein said recognizing unit recognizes the operation processing data and the specific operation from the image data and generates said first code data from said operation processing data and said specific operation by using an optical character recognition function.

28. The facsimile device according to claim 27, further comprising:

a display unit on which visual data of said first code data from said recognizing unit is displayed; and an operation board for inputting a data transmission instruction when said visual data is displayed on said display unit, in order to transmit said first code data from said recognizing unit to the external station via the telephone line.

29. The facsimile device according to claim 27, further comprising:

an operation board for inputting an image data modification instruction to modify the image data input by said input unit.

* * * * *